(12) United States Patent
Takeda et al.

(10) Patent No.: US 7,165,845 B2
(45) Date of Patent: Jan. 23, 2007

(54) IMAGE DISPLAY DEVICE AND PROJECTOR

(75) Inventors: Takashi Takeda, Suwa (JP); Masatoshi Yonekubo, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 42 days.

(21) Appl. No.: 10/394,198

(22) Filed: Mar. 24, 2003

(65) Prior Publication Data

US 2003/0218794 A1 Nov. 27, 2003

(30) Foreign Application Priority Data

| Mar. 22, 2002 | (JP) | ............................. 2002-081598 |
| Apr. 18, 2002 | (JP) | ............................. 2002-116689 |
| Aug. 27, 2002 | (JP) | ............................. 2002-246921 |
| Mar. 4, 2003 | (JP) | ............................. 2003-057503 |

(51) Int. Cl.
- G03B 21/00 (2006.01)
- G03B 21/26 (2006.01)
- G03B 21/28 (2006.01)
- G02B 7/182 (2006.01)
- H04N 9/12 (2006.01)

(52) U.S. Cl. ............... 353/31; 353/94; 353/99; 359/850; 359/872; 348/742; 348/771

(58) Field of Classification Search ................ 353/31, 353/94, 99; 359/850, 855, 872; 348/742, 348/743, 771

See application file for complete search history.

(56) References Cited

U.S. PATENT DOCUMENTS

| 5,504,514 A | | 4/1996 | Nelson .................. 347/130 |
| 5,580,142 A | * | 12/1996 | Kurematsu et al. ......... 353/31 |
| 5,706,061 A | | 1/1998 | Marshall et al. ........... 348/743 |
| 6,147,720 A | * | 11/2000 | Guerinot et al. ........... 348/744 |
| 6,252,636 B1 | * | 6/2001 | Bartlett ................. 348/743 |
| 6,733,139 B2 | * | 5/2004 | Childers et al. ............ 353/94 |
| 6,758,579 B2 | * | 7/2004 | Ishikawa et al. ........... 362/238 |
| 6,863,401 B2 | * | 3/2005 | Penn .................... 353/31 |
| 7,059,727 B2 | * | 6/2006 | Seki et al. ............... 353/85 |
| 2001/0053078 A1 | | 12/2001 | Ishikawa et al. ........... 362/238 |
| 2005/0007563 A1 | * | 1/2005 | Yamazaki et al. .......... 353/98 |

FOREIGN PATENT DOCUMENTS

| EP | 0 985 952 A | 3/2000 |
| GB | 2 307 814 A | 6/1997 |
| JP | 04-317248 | 11/1992 |
| JP | 06-265881 | 9/1994 |
| JP | A 7-152032 | 6/1995 |
| JP | 08-195963 | 7/1996 |
| JP | 10-333599 | 12/1998 |
| JP | 11-52889 | 2/1999 |
| JP | 2000-112031 | 4/2000 |
| JP | 2001-249400 | 1/2001 |
| JP | A 2001-222064 | 8/2001 |
| WO | WO 01/62012 A1 | 8/2001 |

* cited by examiner

*Primary Examiner*—Judy Nguyen
*Assistant Examiner*—Melissa J Koval
(74) *Attorney, Agent, or Firm*—Oliff & Berridge, PLC

(57) ABSTRACT

An image display device and a projector using th image display device includes a tilt-mirror device having a plurality of movable mirror elements. A first color-ray light-source may be arranged so that a first color-ray light is reflected in a predetermined direction when the movable mirror elements are located in the first reflective position, and is reflected in a direction different from the predetemined directon when the movable mirror elements are located in the second reflection position. A second color-ray light-source may be arranged so that a second color-ray light is reflected in the predetemined direction when the mobable mirror elements are located in the second reflection position, and is reflected in a direction different from the predetermined direction when the movable mirror elements are located in the first reflection position.

34 Claims, 19 Drawing Sheets

(a)

(b)

IMAGE DISPLAY DEVICE AND PROJECTOR

BACKGROUND OF THE INVENTION

1. Field of Invention

The present invention relates to an image display device and a projector. More specifically, the invention relates to an image display device using a tilt-mirror device and a technique suitable for a color-display projector using a solid light-emitting element, such as an LED element as a light source.

2. Description of Related Art

According to advances in the increase in brightness and fineness of projected images, an image display device having a tilt-mirror device has been used as a light-modulation device. When a white light source, such as a metal halide lamp, is used as a light source, color splitting is performed in time serial order using a color wheel comprising combined three-color filer for red light (referred to below as an R ray), green light (referred to below as a G ray), and blue light (referred to below as a B ray). Then, within one frame of images, the tilt-mirror device is illuminated with respective R, G, and B rays. Thereby, a full-color image is projected on a screen.

If the power of the white light source, such as the metal halide lamp, is increased for increasing brightness of displayed images, the light source increases in size, and the amount of produced heat also increases by virtue of the power up. Therefore, instead of the white light source, a light-emitting element, such as a light emitting diode (LED) or a semiconductor laser diode (LD), may be used as a light source. For example, the development of the LED arises recently, and in particular the practical application of a blue LED with high accuracy has made a progress. In this case, within one frame of images, light-emitting elements for R, G, and B rays are sequentially turned on in turn so as to illuminate the tilt-mirror device. Thereby, a full-color image is projected on a screen.

SUMMARY OF THE INVENTION

However, in order to obtain white projected images as a whole by sequentially projecting R, G, and B rays, it is necessary that the luminous flux amount of the G ray be about 60% to 80% of the entire luminous flux amount. Therefore, if the same number of light-emitting elements with the same power are provided for each color ray, the G ray is short of the luminous flux amount.

The number of light-emitting elements for the G ray is assumed to increase more than those for the R and B rays. If so, however, the spatial area occupied by the light-emitting elements for the G ray increases as a matter of course.

In an optical system including a light source and a tilt-mirror device, a spatial expanse having effectively operational luminous flux existing therein can be defined as the product of the area and the solid angle (etendue, geometrical extent). This product of the area and the solid angle is stored in the optical system. Therefore, if the special expanse of the light source increases, the angle grabbed by the tilt-mirror device is reduced. Thereby, the luminous flux from the light source cannot be effectively used.

If the light-emitting element, such as the LED or LD, is used as the light source in such a manner, there is a problem that the light source is increased in size because the number of light-emitting elements for the G ray is required more than that of light-emitting elements for other rays. Moreover, as described above, since the spatial expanse of the light source for the G ray is increased, there arises a problem that the amount of effectively usable luminous flux decreases.

The present invention has been made in order to solve the problems described above, and it is an object thereof to provide a compact image-display device with high brightness using a spatial light modulation device such as a tilt-mirror device in particular and a projector having the device.

As described above, in a conventional projector, the white light source, such as the metal halide lamp is used. Such a lamp requires a cooling device because of the large amount of produced heat. This is one of limitations against the miniaturizing the projector. Therefore, it is another object of the present invention, to provide a compact projector with low cost using a solid light-emitting element, in which the illumination flux from the solid light-emitting element can be used for projection light without waste so as to have high light-availability. It is another object of the present invention to display bright and clear color images with high-quality even the light quantity of each solid light-emitting element is small.

In order to achieve the object by solving the problems described above, an image display device provided according to the present invention can include a first color-ray light-source for supplying a first color-ray in a first wavelength region, a second color-ray light-source for supplying a second color-ray in a second wavelength region different from the first wavelength region; and a tilt-mirror device having a plurality of movable mirror elements being alternatively switchable the position thereof between a first reflection position and a second reflection position. The first color-ray light-source can be arranged so that the first color-ray is reflected in a predetermined direction when the movable mirror elements are located in the first reflection position, while the first color-ray is reflected in a direction different from the predetermined direction when the movable mirror elements are located in the second reflection position. The second color-ray light-source can be arranged so that the second color-ray is reflected in the predetermined direction when the movable mirror elements are located in the second reflection position, while the second color-ray is reflected in a direction different from the predetermined direction when the movable mirror elements are located in the first reflection position. Thereby, a bright and compact image display device can be obtained. In particular, since the first color-ray light-source can be reduced in a spatial area, the first color-ray light-source can be miniaturized. Furthermore, as described above using the etendue, the spatial area of the first color-ray light-source is small, so that the effectively usable luminous flux can be increased.

According to a preferred mode of the present invention, the image display device may preferably further can include a light-source driving unit for turning on the first color-ray light-source and the second color-ray light-source by sequentially switching them in turn. Thereby, an observer can recognize the first color-ray and the second color-ray in an integrated state by the naked eye. Therefore, full-color images can be obtained.

According to a preferred mode of the present invention, preferably, the movable mirror elements are rotatable around a predetermined shaft, and the image display device further comprises a tilt-mirror device driving unit for driving the movable mirror elements corresponding to an image signal, so as to be switched at the first reflection position and the second reflection position, which is substantially symmetrical with the first reflection position around the predetermined shaft. Thereby, the movable mirror element can be securely driven at high speed.

According to a preferred mode of the present invention, preferably, the tilt-mirror device driving unit drives the movable mirror elements at the first reflection position for guiding the first color-ray in the predetermined direction when the first color-ray light-source is turned on, while driving the movable mirror elements at the second reflection position for guiding the second color-ray in the predetermined direction when the second color-ray light-source is turned on. Thereby, the first color-ray and the second color-ray can be modulated in contents whether they are guided to the predetermined direction.

According to a preferred mode of the present invention, preferably, the light-source driving unit differentiates a turning-on period of the first color-ray light-source from a turning-on period of the second color-ray light-source within one frame of displayed images. Thereby, even when the amount of the luminous flux of the light source differs, more bright images can be displayed.

According to a preferred mode of the present invention, preferably, the light-source driving unit makes a turning-on period of the first color-ray light-source longer than a turning-on period of the second color-ray light-source within one frame of displayed images. Thereby, even when the first color-ray light-sources and the second color-ray light-sources are the same in the number and power, the luminous flux amount of the first color-ray necessary for obtaining white light can be obtained while the light source is being miniaturized.

According to a preferred mode of the present invention, preferably, the light-source driving unit differentiates a unit period of a first color-ray gradation-expressing period from a unit period of a second color-ray gradation-expressing period. Thereby, appropriate gradation expression can be performed in each color-ray.

According to a preferred mode of the present invention, preferably, the light-source driving unit differentiates a frequency of a first color-ray light-source driving clock signal when driving the first color-ray light-source from a frequency of a second color-ray light-source driving clock signal when driving the second color-ray light-source. Thereby, appropriate light-source driving can be performed in each color-ray.

According to a preferred mode of the present invention, preferably, the first color-ray light-source driving clock signal and the second color-ray light-source driving clock signal further have a unit clock signal with a frequency common to both the signals. Thereby, the driving circuit can be simplified.

According to a preferred mode of the present invention, preferably, the second color-ray light-source can include a plurality of red color-ray light-emitting elements and a plurality of blue color-ray light-emitting elements, and the red color-ray light-emitting elements and the blue color-ray light-emitting elements are arrange on a common substrate. Thereby, the light-emitting element with the large luminous flux amount can be efficiently emitted in its own. In addition, the light-emitting element below means an element including a solid light-emitting element in the specification.

According to a preferred mode of the present invention, preferably, the first color-ray light-source and the second color-ray light-source can have a plurality of light-emitting elements, respectively. Each of the light-emitting elements can include a light-emitting chip and a lens member for guiding light from the light-emitting chip to the substantially entire region of the tilt-mirror device. Thereby, the tilt-mirror device can be efficiently illuminated, obtaining bright images.

According to a preferred mode of the present invention, preferably, each of the light-emitting elements further includes a tapered rod member for guiding light from the light-emitting chip in a predetermined direction. Thereby, light from the light-emitting chip can be more efficiently guided to the tilt-mirror device.

According to a preferred mode of the present invention, preferably, the light-emitting chip and the lens member are formed integrally with each other. The manufacturing is thereby facilitated while unevenness of light intensity of each light-emitting element can be reduced.

An image display device provided according to the present invention can include a first color-ray light-source for supplying a first color-ray in a first wavelength region, a second color-ray light-source for supplying a second color-ray in a second wavelength region being at least different from the first wavelength region, a spatial light modulation device for modulating light from the first color-ray light-source and the second color-ray light-source corresponding to an image signal; and a light-source drive unit for differentiating a turning-on period of the first color-ray light-source from a turning-on period of the second color-ray light-source within one frame of displayed images. Thereby, a compact image display device displaying bright images and using a spatial light modulation device can be provided. Also, even if the luminous flux amount of each light-source is different, more bright images can be displayed.

According to a preferred mode of the present invention, preferably, the light-source drive unit makes a turning-on period of the first color-ray light-source longer than a turning-on period of the second color-ray light-source within one frame of displayed images. Thereby, even the first color-ray light-sources and the second color-ray light-sources are the same in power and the number, the luminous flux amount of the first color-ray necessary for obtaining white light can be obtained while the light source is being miniaturized.

According to a preferred mode of the present invention, preferably, the light-source drive unit can make a gradation-expressing period of the first color-ray light-source longer than a gradation-expressing period of the second color-ray light-source within one frame of displayed images. Thereby, even the first color-ray light-sources and the second color-ray light-sources are the same in power and the number, the luminous flux amount of the first color-ray necessary for obtaining white light can be obtained while the light source is being miniaturized.

According to a preferred mode of the present invention, preferably, the first color-ray is green and the second color-ray is at least any one of red and blue. Thereby, the luminous flux amount required for obtaining white light can be obtained while the spatial area captured by the G-ray light source being reduced.

According to a preferred mode of the present invention, preferably, the light-source drive unit differentiates a unit period of a first color-ray gradation-expressing period from a unit period of a second color-ray gradation-expressing period. Thereby, appropriate gradation expression can be performed in each color-ray.

According to a preferred mode of the present invention, preferably, the light-source drive unit differentiates a frequency of a first color-ray light-source driving clock signal when driving the first color-ray light-source from a frequency of a second color-ray light-source driving clock signal when driving the second color-ray light-source. Thereby, appropriate light-source driving can be performed in each color-ray.

According to a preferred mode of the present invention, preferably, the first color-ray light-source driving clock signal and the second color-ray light-source driving clock signal further have a unit clock signal with a frequency common to both the signals. Thereby, the driving circuit can be simplified.

According to a preferred mode of the present invention, preferably, the spatial light modulation device is a tilt-mirror device having a plurality of movable mirror elements that can alternatively select a first reflection position and a second reflection position. Further, the tilt-mirror device can be arranged so that the first color-ray and the second color-ray are reflected in a predetermined direction when the movable mirror elements are located in the first reflection position, while the first color-ray and the second color-ray are reflected in a direction different from the predetermined direction when the movable mirror elements are located in the second reflection position. Thereby, a compact and bright image display device using the tilt-mirror device can be provided. In particular, since the spatial area of the first color-ray light-source can be reduced, the first color-ray light-source can be miniaturized. Furthermore, as described above using the etendue, the spatial area of the first-color light-source is small, so that the effectively usable luminous flux can be increased.

According to a preferred mode of the present invention, preferably, the spatial light modulation device is a reflective liquid crystal light valve or a transmissive liquid crystal light valve. Thereby, a compact and bright image display device using the liquid crystal light valve can be provided.

According to a preferred mode of the present invention, a projector may be provided, which can include the image display device described above and a projection lens for projecting modulated light from the spatial light modulation device. Thereby, a compact projector capable of obtaining bright images can be provided.

According to the present invention, a field lens is arranged on the front surface of the reflection type spatial light-modulation, and on an area and position conjugated to an entrance pupil of the projection lens (projection lens system) with a modulation optical system including the field lens and the reflection spatial light-modulation device therebetween, a plurality of solid light-emitting elements, such as LED elements, are arranged so as to form a light-emitting region. That is, a projector according to the present invention can include a light source having a light-emitting region providing a plurality of solid light-emitting elements arranged thereon, a reflection type spatial light-modulation device having a modulation region for forming images by switching an illumination luminous flux from the light source, a projection lens for projecting a display luminous flux from the spatial light-modulation device, and a field lens with positive refracting power arranged in the vicinity of the spatial light-modulation device so as to transmit the illumination luminous flux and the display luminous flux therethrough. An entrance pupil of the projection lens is conjugated to the light-emitting region of the light source with a modulation optical system including the field lens and the spatial light-modulation device therebetween.

In this projector, since the entrance pupil of the projection lens is conjugated to the light-emitting region with the modulation optical system therebetween, the entire light output from the light-emitting region toward the modulation optical system enters the entrance pupil of the projection lens. Therefore, the illumination luminous flux output from the light-emitting region to the modulation optical system, if the spatial light-modulation device is in an ON state, entirely becomes the display luminous flux so as to be output toward a screen. The illumination luminous flux output from the light-emitting region of the light source is thereby efficiently used so as to output as the display luminous flux. Although there is absorption due to the lens, the entire light amount of the solid light-emitting elements arranged on the light-emitting region can be used for projecting images without being wasted. Accordingly, excessive solid light-emitting elements arranged in vain are eliminated, so that a projector with high utilization efficiency of the illumination luminous flux from the solid light-emitting elements and capable of displaying bright and clear color images with a simplest configuration.

In the case of the spatial light-modulation device is a reflection type in which the reflection direction does not change, for example a reflection liquid crystal panel, the direction of the light-emitting region conjugated to the entrance pupil of the projection lens is uniquely determined. On the other hand, in the case of a so-called digital mirror device (DMD) where small movable mirror elements are arrayed in a matrix arrangement, the illumination luminous flux is on-off controlled or modulated by the movement of the movable mirror elements within a range of several tens degree. Therefore, it is necessary that the entrance pupil of the reflection lens be optically conjugated to the light-emitting region with the modulation optical system therebetween, in which the movable mirror elements of the spatial light-modulation device are in the ON-state. That is, in the case where the light-emitting region is arranged within the range of the conjugated image of the entrance pupil, the image range is to be a range formed in the switching direction of the spatial light-modulation device or the incident direction of the ON-state.

Moreover, in the spatial light-modulation device where the movable mirror elements can select two states of the first effective angle (reflection position) and the second effective angle (reflection position), there are two conjugated positions. Therefore, the light source can have two light-emitting regions. That is, the light source can have a first light-emitting region conjugated to the entrance pupil of the projection lens with the modulation optical system therebetween, in which the movable mirror elements are in a state of the first effective angle, and a second light-emitting region conjugated to the entrance pupil of the projection lens with the modulation optical system therebetween, in which the movable mirror elements are in a state of the second effective angle. Since the light source can be provided with the two light-emitting regions which are conjugated to the entrance pupil of the projection lens so that the emitted illuminating luminous flux is not wasted, the area captured by the solid light-emitting elements can be doubled, enabling more bright images to be displayed.

However, since illumination luminous fluxes output from two light-emitting regions cannot be simultaneously modulated, the solid light-emitting elements emitting different-color illumination luminous fluxes may be preferably arranged on the two respective light-emitting regions. Furthermore, in the case where the solid light-emitting elements emitting different-color illumination luminous fluxes are arranged, since areas of the first and second light-emitting regions become equal, the allocation becomes a subject. In view of spectral luminous efficiency, in color-rays emitted from the solid light-emitting elements with each color, such as the LED elements and the organic EL, the light-power sensitivity of the green illumination luminous flux is extremely small and about half of those of other colors. Accordingly, it is preferable to use one surface of the doubled light-emitting regions for arranging the solid light-emitting elements emitting the green ray. Such an arrangement agrees with the switching control of different-color illumination luminous fluxes at different timing.

A method for arranging the solid light-emitting elements within the range of the light-emitting region substantially agreeing with the image range of the entrance pupil due to the modulation optical system is that a range substantially agreeing with a circular image due to the field lens of the entrance pupil is filled with a plurality of the solid light-emitting elements, or the plurality of the solid light-emitting elements are arranged to disperse within the range. Thereby, the solid light-emitting elements can be efficiently arranged, so that the luminous fluxes emitted from the entire solid light-emitting elements can be utilized for displaying images.

If the scaling factor (magnification) of the modulation optical system constituted of the field lens and the spatial light modulation device is selected to be about 1, light rays become parallel, i.e., telecentric system in between the field lens and the spatial light modulation device. Therefore, in the spatial light modulation device having the movable mirror elements, invalid light can be omitted at a small angle, facilitating to perform switching and to form images with high contrast. If the scaling factor (magnification) of the modulation optical system is selected to be 1 or more, since display luminous flux may interfere with the light-emitting region, the above advantages may be difficult. On the other hand, the scaling factor (magnification) of the modulation optical system may be selected to be 1 or less, wherein since the area of the light-emitting region can be increased, a number of the solid light-emitting elements may be arranged. In this case, convergent light enters the spatial light modulation device from the field lens, however, image quality may not be largely affected as long as it is within the switchable angular range of the spatial light modulation device.

By arranging the solid light-emitting elements so as to make the light-emitting region is conjugated to the entrance pupil of the projection lens in such a manner, wasteful illumination luminous flux can be prevented from being produced. In focusing attention on the individual solid light-emitting elements, an individual light-emitting surface of the solid light-emitting elements, i.e., the light-emitting section, is small. Furthermore, in the power distribution of the generated illumination luminous flux, there are individual differences between the individual solid light-emitting elements. Therefore, even if the solid light-emitting elements are simply arranged on the light-emitting region so as to illuminate the modulation region of the spatial light modulation device such as a liquid crystal device and a mirror device with the illumination luminous flux output from the solid light-emitting elements, it is difficult to uniformly illuminate the region without unevenness. Therefore, according to the present invention, the micro-lens array is arranged close to the spatial light modulation device, i.e., on the emitting side, on the solid light-emitting elements, so as to form the light-emitting region, while the individual light-emitting sections of the solid light-emitting elements are conjugated to the modulation region with the illumination lens optical system therebetween, which includes the micro-lens array.

In this projector, by forming the optical system so as to make the individual light-emitting sections of the solid light-emitting elements are conjugated to the modulation region, the modulation region is efficiently illuminated with the illumination luminous flux emitted from the individual light-emitting sections. Therefore, also in a microscopic point that is the individual light-emitting section of the solid light-emitting element, wasteful illumination luminous flux can be prevented. Furthermore, with the illumination luminous flux emitted from the individual solid light-emitting elements, the entire modulation region is illuminated, and the light power required for projection is acquired by the overlapping of these fluxes. Since the entire modulation region is illuminated by the individual solid light-emitting elements, the unevenness due to individual differences in the solid light-emitting elements can be eliminated so as to uniformly illuminate the entire modulation region. Furthermore, the entire modulation region is illuminated by the individual solid light-emitting elements conjugated to the modulation region, so that the illumination luminous flux is not wasteful, enabling a compact and bright projector capable of efficiently illuminating with a small structure to be provided.

By arranging optical axes of the solid light-emitting elements and the micro-lenses, which are paired with the solid light-emitting elements, to be shifted for each pair, so that images of the light-emitting sections are overlapped in the spatial light modulation device, wasteful illumination luminous flux can be effectively prevented from being produced from the individual solid light-emitting elements.

Furthermore, in the case where the modulation region is substantially square-shaped, the individual light-emitting section of the solid light-emitting element is also to be square-shaped, and sides of the respective square shapes are arranged to be substantially in parallel with each other, so that wasteful illumination luminous flux can be effectively prevented from being produced from the individual solid light-emitting elements. In the case where the modulation region is rectangular-shaped, it is preferable that the light-emitting section also be rectangular-shaped, and sides in the longitudinal direction of the respective rectangular shapes be arranged to be substantially in parallel with each other. Also, by substantially equalizing an aspect ratio of the light-emitting section to an aspect ratio of the modulation region of the spatial light modulation device so as to be analogous-shaped, wasteful illumination luminous flux can be prevented from being produced because the illumination luminous fluxes from the individual solid light-emitting elements can be easily overlapped.

Instead of square-shaped light-emitting sections, micro-lenses different in lengthwise and lateral curvatures or magnification can be adopted as the individual micro-lenses constituting the micro-lens array, so that images of the light-emitting sections, which are analogous or substantially agreeing with the modulation region, can be formed on the spatial light modulation device. Therefore, by overlapping these images of the light-emitting sections, the illumination can be performed without waste and unevenness. In this case, the first image-formation position due to the lengthwise shape of the micro-lens is differentiated from the second image-formation position due to the lateral shape of the micro-lens. However, by arranging the spatial light modulation device between the first and second image-formation positions, the modulation region can be illuminated by the individual solid light emitting elements without waste.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
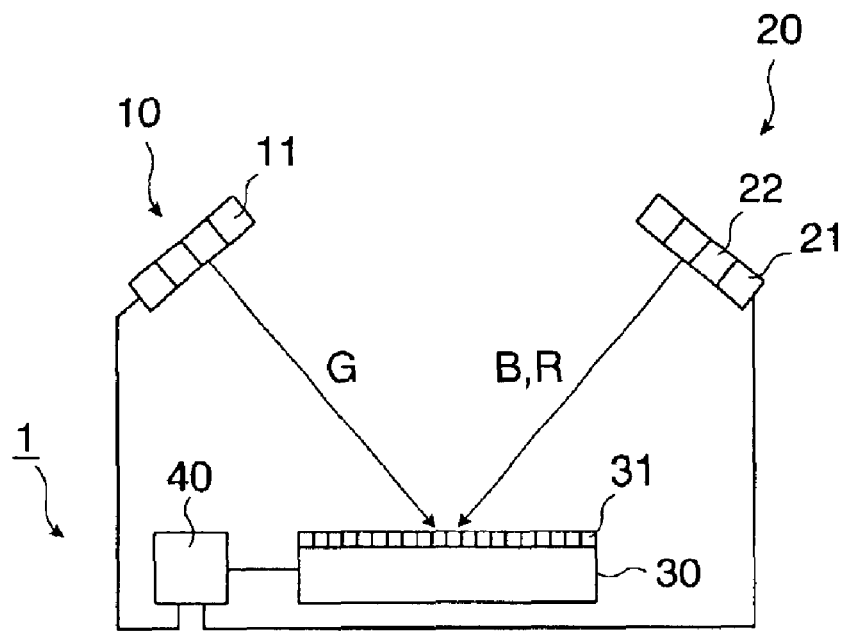
FIG. 1 is a drawing illustrating a summarized configuration of an image display device according to a first embodiment.

Preferred embodiments according to the present invention will be described in detail below with reference to the attached drawings. FIG. 1 is a drawing illustrating a summarized configuration of an image display device 1 according to an embodiment of the present invention. A first color-ray light source 10 supplies a G ray, which is first color light in a first wavelength region. The first color-ray light source 10 is constituted of a plurality of G-ray light-emitting elements 11. LDs or LEDs may be used for the light-emitting elements. An organic EL element may also be used for the first color-ray light source 10.

A second color-ray light source 20 supplies a B ray or an R ray, which are second color light in a second wavelength region different from the first wavelength region. The second color-ray light source 20 is constituted of a plurality of R-ray light-emitting elements 21 and B-ray light-emitting elements 22. The configuration of these light-emitting elements will be described later.

The light emitted from the first color-ray light source 10 or the second color-ray light source 20 enters a tilt-mirror device 30 from the direction different from each other. The tilt-mirror device 30 can include a plurality of movable mirror elements 31. A driving control unit 40 controls the first color-ray light source 10, the second color-ray light source 20, and the tilt-mirror device 30. The driving control will be described in greater detail below.

Figure 2:
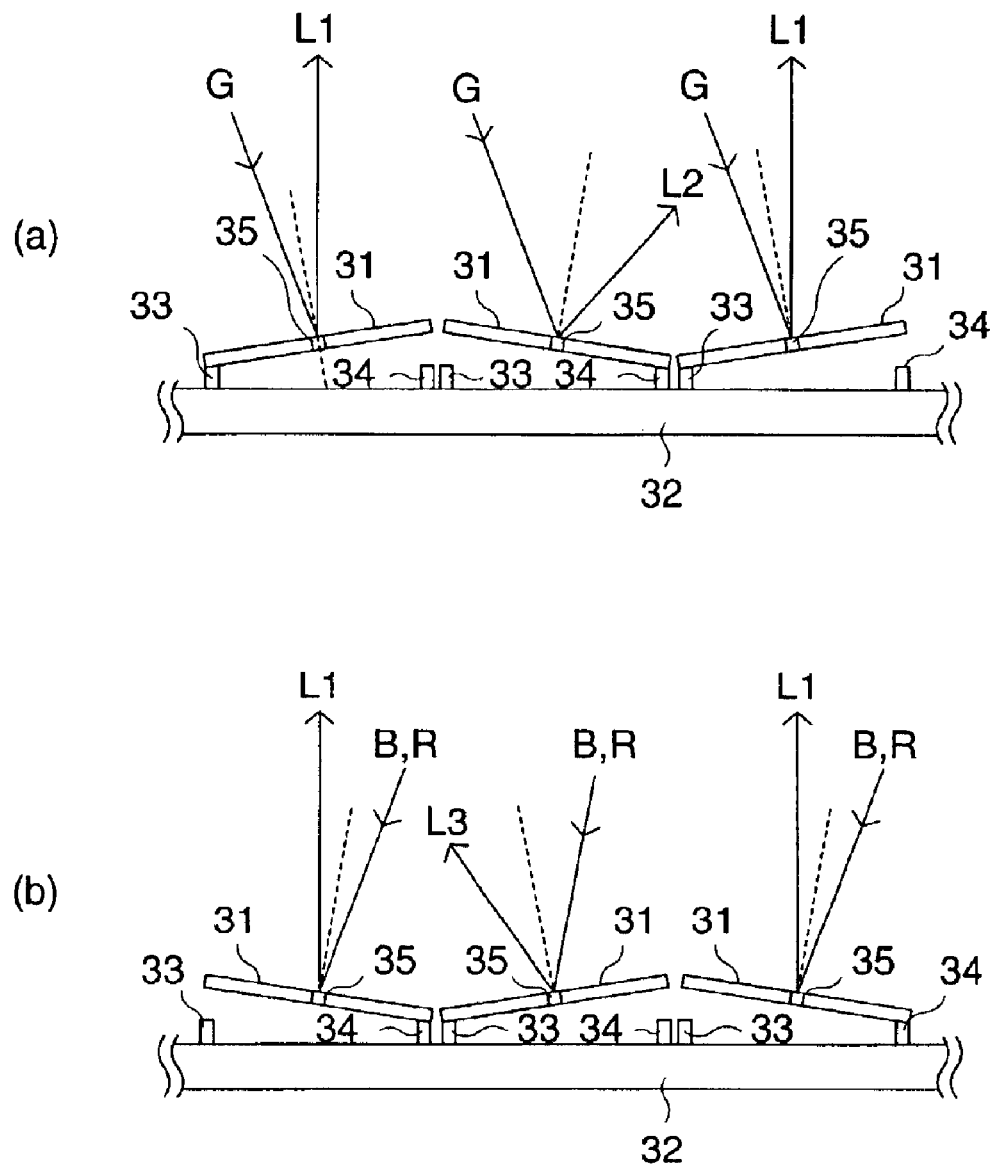
FIG. 2 is a partially enlarged view of a configuration a tilt mirror device.

Referring now to FIGS. 2(a) and 2(b), a configuration, in which light emitted from the first color-ray light source 10 or the second color-ray light source 20 is modulated corresponding to an image signal, will be described. FIGS. 2(a) and 2(b) are partially enlarged views of the tilt-mirror device 30. FIG. 2(a) is a drawing showing a configuration, in which the G-ray from the first color-ray light source 10 is modulated. The tilt-mirror device 30 is provided with a plurality of movable mirror elements 31 disposed on the surface. The movable mirror element 31 is rotatable around a predetermined shaft 35. On a substrate 32, two electrodes 33 and 34 are arranged in the vicinity of the periphery of one movable mirror element 31.

The state, in which the movable mirror element 31 is inclined about the predetermined shaft 35 so as to abut the electrode 33, is called a first reflection position. Similarly, the state, in which the movable mirror element 31 is inclined about the predetermined shaft 35 so as to abut the electrode 34, is called a second reflection position. In addition, the movable mirror element 31 can alternatively select the first reflection position and the second reflection position.

The driving control unit 40 drives the movable mirror element 31 corresponding to an image signal to the first reflection position or the second reflection position arranged substantially symmetrically with the first reflection position around the predetermined shaft 35. In FIG. 2(a), the movable mirror elements 31 on the right and left are located at the first reflection position. Whereas, the central movable mirror element 31 in FIG. 2(a) is located at the second reflection position.

More specifically, if a pixel is to be ON (turned on) while the G-ray light-emitting element 11 is turned on, the driving control 40 drives the tilt-mirror device 30 so as to locate the movable mirror element 31 corresponding to the pixel at the first reflection position. Similarly, if a pixel is to be OFF (turned off) while the G-ray light-emitting element 11 is turned on, the driving control 40 drives the tilt-mirror device 30 so as to locate the movable mirror element 31 corresponding to the pixel at the second reflection position.

Thereby, if an image signal corresponding to the G-ray designates ON of a pixel, color light from the G-ray light-emitting element 11 is guided to an L1 direction by the movable mirror element 31 corresponding to the pixel. Similarly, if an image signal corresponding to the G-ray designates OFF of a pixel, color light from the G-ray light-emitting element 11 is guided to an L2 direction different from the L1 direction by the movable mirror element 31 corresponding to the pixel.

By this configuration, if viewed from a predetermined visual field in the predetermined L1 direction (light proceeding in the L2 direction can be shielded.), the G-ray can be modulated into light (ON) proceeding in the predetermined L1 direction and light (OFF) proceeding in the L2 direction in response to an image signal.

Next, the modulation of the R-ray or B-ray will be described with reference to FIG. 2(b). The second color-ray light source 20 is configured so that if the movable mirror element 31 is located at the second reflection position, the R-ray or B-ray is reflected in the predetermined L1 direction, while if the movable mirror element 31 is located at the first reflection position, the R-ray or B-ray is reflected in an L3 direction different from the predetermined L1 direction.

More specifically, if a pixel is to be ON (turned on) while the R-ray light-emitting element 21 or the B-ray light-emitting element 22 is turned on, the driving control 40 drives the tilt-mirror device 30 so as to locate the movable mirror element 31 corresponding to the pixel at the second reflection position. Similarly, if a pixel is to be OFF (turned off) while the R-ray light-emitting element 21 or the B-ray light-emitting element 22 is turned on, the driving control 40 drives the tilt-mirror device 30 so as to locate the corresponding movable mirror element 31 at the first reflection position.

Thereby, if an image signal corresponding to an R-image or a B-image designates ON of a pixel, color light from the R-ray light-emitting element 21 or the B-ray light-emitting element 22 is guided in the L1 direction by the movable mirror element 31 corresponding to the pixel. Similarly, if an image signal corresponding to the R-image or the B-image designates OFF of a pixel, color light from the R-ray light-emitting element 21 or the B-ray light-emitting element 22 is guided in the L3 direction different from the L1 by the movable mirror element 31 corresponding to the pixel.

By this configuration, if viewed from a predetermined visual field in the predetermined L1 direction (light proceeding in the L3 direction being shielded), the R-ray or the B-ray can be modulated into light (ON) proceeding in the predetermined L1 direction and light (OFF) proceeding in the L3 direction in response to an image signal.

The respective movable mirror elements 31 in the tilt-mirror device 30 modulates the R-ray, B-ray, and G-ray during one frame period by a PWM (pulse width modulation) method so as to depict colors and brightness of the entire pixels in the frame.

Figure 3:
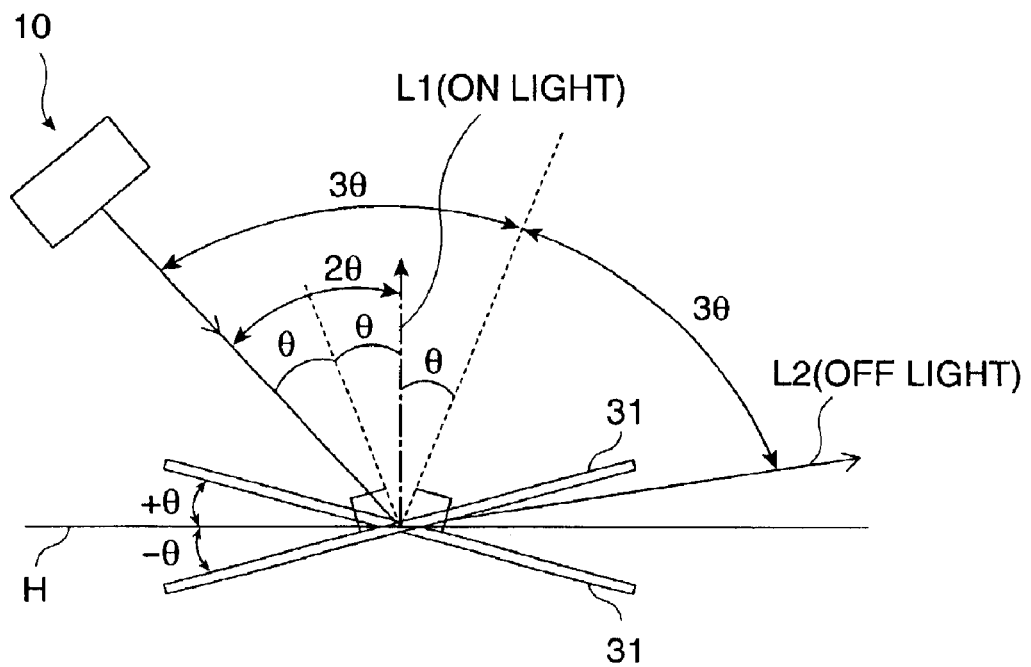
FIG. 3 is a drawing of the tilt mirror device showing a reflection angle.

The relationship between the inclined angle relative to a plane defined by arrays of a plurality of the movable mirror elements 31 (referred to below as a horizontal plane H) and the reflection angle will be described with reference to FIG. 3. The movable mirror element 31 is assumed to be rotatable at an angle of ±θ relative the horizontal plane H. At this time, the predetermined L1 direction (ON) is angled at 2θ relative to the light from the first color-ray light source 10. Also, the predetermined L2 direction (OFF) is angled at 6θ relative to the light from the first color-ray light source 10.

Figure 4:
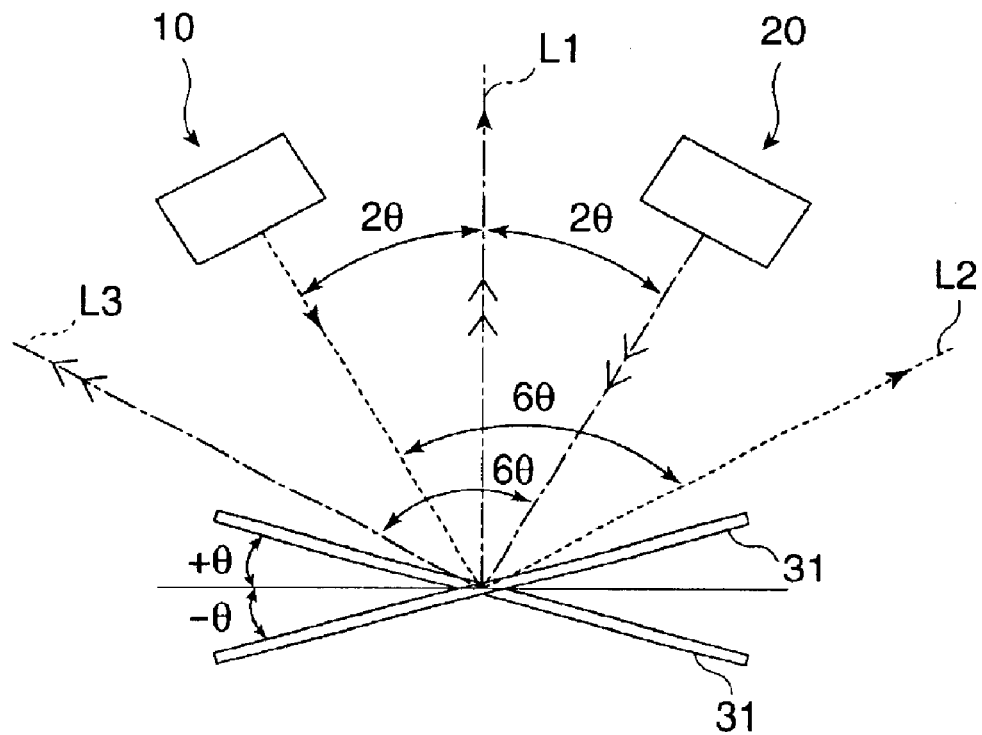
FIG. 4 is another drawing of the tilt mirror device showing a reflection angle.

The relationship between the inclined angle of the movable mirror element 31 relative to the horizontal plane and the reflection angle is shown FIG. 4 in the case where two light sources of the first color-ray light source 10 and the second color-ray light source 20 are arranged. The respective light sources are arranged so that the predetermined L1 direction (ON) of light from the first color-ray light source 10 is aligned with the predetermined L1 direction (ON) of light from the second color-ray light source 20. The predetermined L2 direction, in which light from the first color-ray light source 10 is reflected as OFF light, is angled at 6θ relative to light from the first color-ray light source 10. Similarly, the predetermined L3 direction, in which light from the second color-ray light source 20 is reflected as OFF light, is also angled at 6θ relative to light from the second color-ray light source 20. The predetermined L2 and L3 directions are symmetrical with each other about the predetermined L1 direction.

The turning-on period and timing of the R-ray light-emitting elements 21, the G-ray light-emitting element 11, and the B-ray light-emitting elements 22 for obtaining full-color images will now be described. FIG. 5(a) is a drawing showing the turning-on period and timing. The charts in FIG. 5(a) indicate a "frame signal", "R-turning-on signal", "G-turning-on signal", "B-turning-on signal", and "driving polarity inversion signal". The time is plotted in the horizontal axis of the chart.

First, the high-period of the "frame signal" indicates the period of one frame of an image signal. Also, the high-period of the "R-turning-on signal" means the turning-on period of the R-ray light-emitting elements 21 (turning-on period RT), which agrees with a sub-frame period of images corresponding to the R-ray. The high-period of the "G-turning-on signal" means the turning-on period of the G-ray light-emitting elements 11 (turning-on period GT), which agrees with a sub-frame period of images corresponding to the G-ray. The high-period of the "B-turning-on signal" means the turning-on period of the B-ray light-emitting elements 22 (turning-on period BT), which agrees with a sub-frame period of images corresponding to the B-ray. Finally, the "driving polarity inversion signal" is a signal showing to locate the movable mirror element 31 whether at the first reflection position or at the second reflection position when the pixel (on a screen) is to be ON. In FIG. 5(a), the high-period of the "driving polarity inversion signal" designates to locate the movable mirror element 31 at the second reflection position when the pixel is to be ON, while the low-period designates to locate the movable mirror element 31 at the first reflection position when the pixel is to be ON.

In the example in FIG. 5(a), during one frame, in the first, the G-ray light-emitting element 11 is turned on for the predetermined turning-on period GT, and the R-ray light-emitting element 21 is turned on for the turning-on period RT after the turning-on period GT finished. Then, the B-ray light-emitting element 22 is turned on for the predetermined turning-on period BT after the turning-on period RT finished. The driving polarity inversion signal is in the low state for the turning-on period GT. That is, the driving polarity inversion signal locates the movable mirror element 31 at the first reflection position when the pixel is to be ON for this period. On the other hand, the driving polarity inversion signal is in the high state for the turning-on period RT and the turning-on period BT. In other words, the driving polarity inversion signal locates the movable mirror element 31 at the second reflection position when the pixel is to be ON for this period.

The driving control unit 40 serving also as a light source driver turns on the R-ray light-emitting element 21, the G-ray light-emitting element 11, and the B-ray light-emitting element 22 by sequentially switching them in turn. An observer can recognize the R-ray, the G-ray, and the B-ray in the integrated state with time, obtaining full-color images. Furthermore, the turning-on periods GT, RT, and BT of each color light-emitting element are independently differed from each other within one frame of displayed images. Thereby, even when the amount of the luminous flux of each light source differs, appropriate images can be displayed. In the example in FIG. 5(a), the turning-on periods GT is longest, the turning-on periods BT is next longer, and the turning-on periods RT is shortest.

As described above, it is necessary that the G-ray have 60% to 80% of the entire luminous flux amount for obtaining white light. In order to do so, the turning-on period GT of the G-ray light-emitting element 11 is increased longer than the turning-on period RT of the R-ray light-emitting element 21 and the turning-on period BT of the B-ray light-emitting element 22. Thereby, even when the G-ray light-emitting elements 11, the R-ray light-emitting elements 21, and the B-ray light-emitting elements 22 are the same in the number and power, the luminous flux amount of the G-ray necessary for obtaining white light can be obtained while the light source is being miniaturized.

In order to guide the G-ray in the predetermined direction L1, the driving control unit 40 drives the movable mirror element 31 to the first reflection position during the turning-on of the G-ray light-emitting element 11. Furthermore, in order to guide the R-ray or B-ray in the predetermined direction L1, the driving control unit 40 drives the movable mirror element 31 to the second reflection position during the turning-on of the R-ray light-emitting element 21 or the B-ray light-emitting element 22.

In other words, the reflection position (first reflection position) of the movable mirror element 31 when the G-ray is guided in the predetermined direction L1 is opposite in position to the reflection position (second reflection position) of the movable mirror element 31 when the R-ray or B-ray is guided in the predetermined direction L1. Therefore, as shown in the driving polarity inversion signals in FIG. 5(a), the driving polarity of the G-ray light-emitting element 11 for the movable mirror element 31 is inverted from that of the R-ray light-emitting element 21 or the B-ray light-emitting element 22. Thereby, the R-ray, the G-ray, and the B-ray can be modulated in contents whether they are guided to the predetermined direction.

FIG. 5(b) is a drawing showing the drive timing of the tilt-mirror device 30. FIG. 5(b) shows timing charts of a "frame signal", "R-gradation expressing signal", "G-gradation expressing signal", "B-gradation expressing signal", and "clock". The time is plotted in the horizontal axis of the charts. More specifically, the high-period of the "R-gradation expressing signal" corresponds to a gradation-expressing period RK, the high-period of the "G-gradation expressing signal" corresponds to a gradation-expressing period GK, and the high-period of the "B-gradation expressing signal" corresponds to a gradation-expressing period BK. Referring to FIG. 5(b), the gradation-expressing period GK arises at first, the gradation-expressing period RK continues after the gradation-expressing period GK finished, and then, the gradation-expressing period BK arises after the gradation-expressing period RK finished. As shown in FIG. 5(b), the duration of the gradation-expressing period GK is longest and the gradation-expressing period RK is shortest.

The gradation-expressing period GK is the duration necessary for achieving the optical power (gradation) of the G-ray by the spatial light modulation device (tilt-mirror device 30). Also, the gradation-expressing period GK agrees with a sub-frame period of images corresponding to the G-ray. Within the gradation-expressing period GK, incident light is modulated corresponding to an image signal by a method of pulse-duration modulation. More specifically, if the image signal designates the optical power of the G-ray with n-bits (n is a positive integer), the gradation-expressing period GK is divided into n unit periods with a length ratio of $2^0:2^1: \ldots :2^{(n-1)}$. The movable mirror element 31 maintains any one of the ON state and OFF state in each of the n unit periods. In order to achieve the predetermined optical power (gradation), the movable mirror element 31 may be turned on for the necessary unit periods of the n unit periods so that incident light proceeds in the direction L1 for the time proportional to its optical power. For example, if the maximum value of the optical power designated by an image signal is $((2^n)-1)$, for the entire n unit periods, i.e., for the substantially entire of the gradation-expressing period GK, the mirror may be in the ON state. On the other hand, if the minimum value of the optical power designated by an image signal is (0), for the entire n unit periods, i.e., for the substantially entire of the gradation-expressing period GK, the mirror may be in the OFF state. In addition, since the gradation-expressing period RK and the gradation-expressing period BK are the same as the gradation-expressing period GK, the description is omitted. However, the position of the movable mirror element 31 in the ON state in the gradation-expressing period RK and the gradation-expressing period BK is different from the position of the movable mirror element 31 in the ON state in the gradation-expressing period GK.

As shown in FIG. 5(b), lengths of these gradation-expressing periods RK, GK, and BK may be different. If the lengths of the gradation-expressing periods RK, GK, and BK are different, the respective unit periods divided into the n units also differs corresponding to the each color light of R, G, and B.

The gradation-expressing period RK substantially agrees with the turning-on period RT shown in FIG. 5(a). The gradation-expressing period GK substantially agrees with the turning-on period GT shown in FIG. 5(a). Also, the gradation-expressing period BK substantially agrees with the turning-on period BT shown in FIG. 5(a).

As the tilt-mirror device 30 simultaneously starts modulating the movable mirror elements 31 corresponding to the entire pixels of images in a sub-frame in synchronous with the starting timing of the sub-frame, the entire movable mirror elements 31 are driven according to the timing charts shown in FIG. 5(b).

The driving control unit 40 can differentiate the frequency of a G-ray light-source driving clock signal when driving the G-ray light-emitting element 11 from the frequency of a second-ray light-source driving clock signal when driving the R-ray light-emitting element 21 or the B-ray light-emitting element 22. Thereby, the light source can be appropriately driven for each color. Furthermore, it is more preferable that the G-ray light-source driving clock signal and the second-ray light-source driving clock signal have a unit clock signal with the frequency common to both the signals. Thereby, the driving circuit can be simplified.

Even when the number of the R-ray light-emitting element 21, the G-ray light-emitting element 11, and the B-ray light-emitting element 22 is different from each other, the turning-on period or the gradation-expressing period for the G-ray may be controlled to be larger than the other rays.

Figure 6:
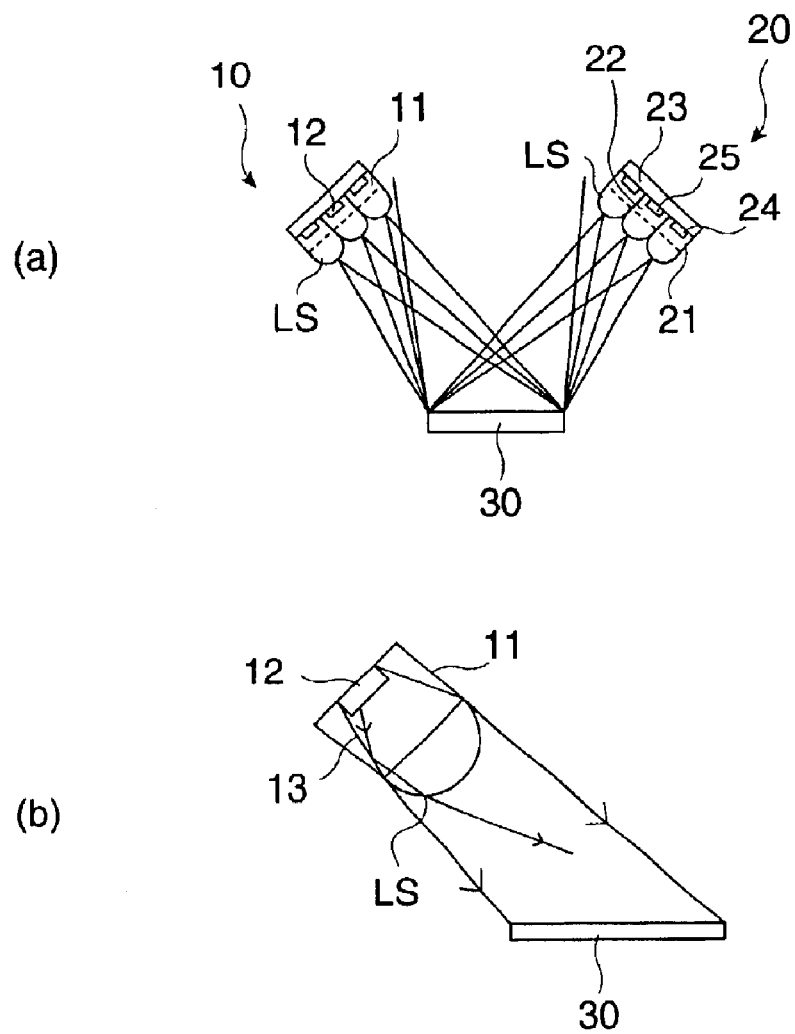
FIG. 6 is a drawing showing a configuration of a light source.

The configuration of the light source will be now described with reference to FIGS. 6(a) and 6(b). FIG. 6(a) is a drawing of the configuration of the light source supplying illumination light. In addition, in FIG. 6(a), part of the configuration such as the movable mirror element is omitted for brevity.

As described above, the first color-ray light source 10 and the second color-ray light source 20 have a plurality of the light-emitting elements 11, 21, and 22 for each color, respectively. Also, these light-emitting elements 11, 21, and 22 for each color have light-emitting chips 12, 24 and 25, and a lens member LS for guiding light-source light from the light-emitting chips 12, 24 and 25 to the substantially entire region of the tilt-mirror device 30, respectively. A plurality of the R-ray light-emitting elements 21 and a plurality of the B-ray light-emitting elements 22 are mounted on a common substrate 23. Thereby, the light-emitting element with the large luminous flux amount can be efficiently emitted in its own.

FIG. 6(b) is a drawing showing the configuration of the light-emitting element more in detail using the G-ray light-emitting element 11 as a typical example. The G-ray light-emitting element 11 can include a tapered rod member 13 for guiding light-source light to the tilt-mirror device 30, which is directed in the predetermined direction. In the tapered rod member 13, a reflection surface is formed inside the tapered portion. Thereby, light from the light-emitting chip 12 can be efficiently emitted, and the tilt-mirror device 30 is efficiently illuminated, obtaining bright images. Moreover, it is preferable that the light-emitting chip 12 be formed integrally with the lens member LS. The manufacturing is thereby facilitated while unevenness of light intensity of each light-emitting element can be reduced.

Figure 7:
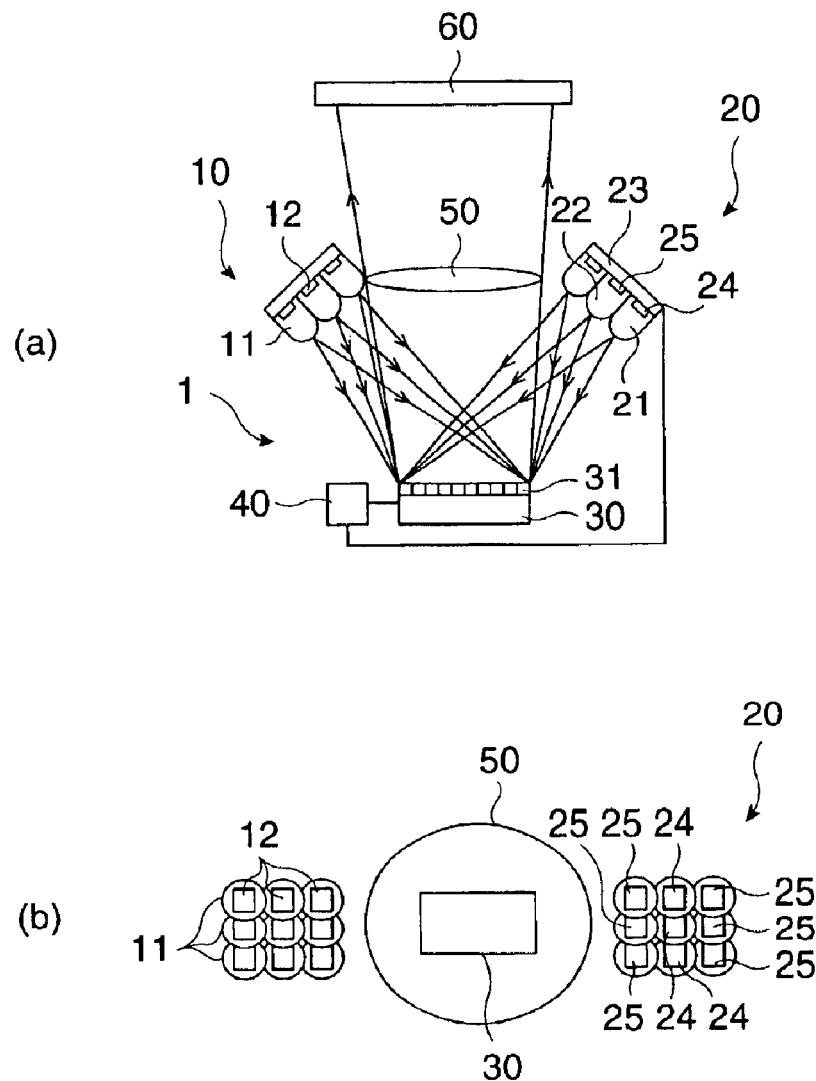
FIG. 7 is a drawing illustrating a summarized configuration of a projector according to a second embodiment.

A projector according to a second embodiment of the present invention will be described with reference to FIGS. 7(a) and 7(b). Like reference characters designate like portions common to the first embodiment described above and a detail description thereof is omitted.

Out of the modulated light by the image display device 1 described above, only the light proceeding in the predetermined direction L1 (see FIGS. 2(a) and 2(b).) enters a projection lens 50. Whereas the light proceeding in the direction L2 or L3 (see FIGS. 2(a) and 2(b).) does not enter the projection lens 50 and can be discarded. The projection lens 50 projects an image displayed by the image display device 1 corresponding to an image signal on a screen 60. An observer of the screen 60 recognizes the image as a full color.

Figure 8:
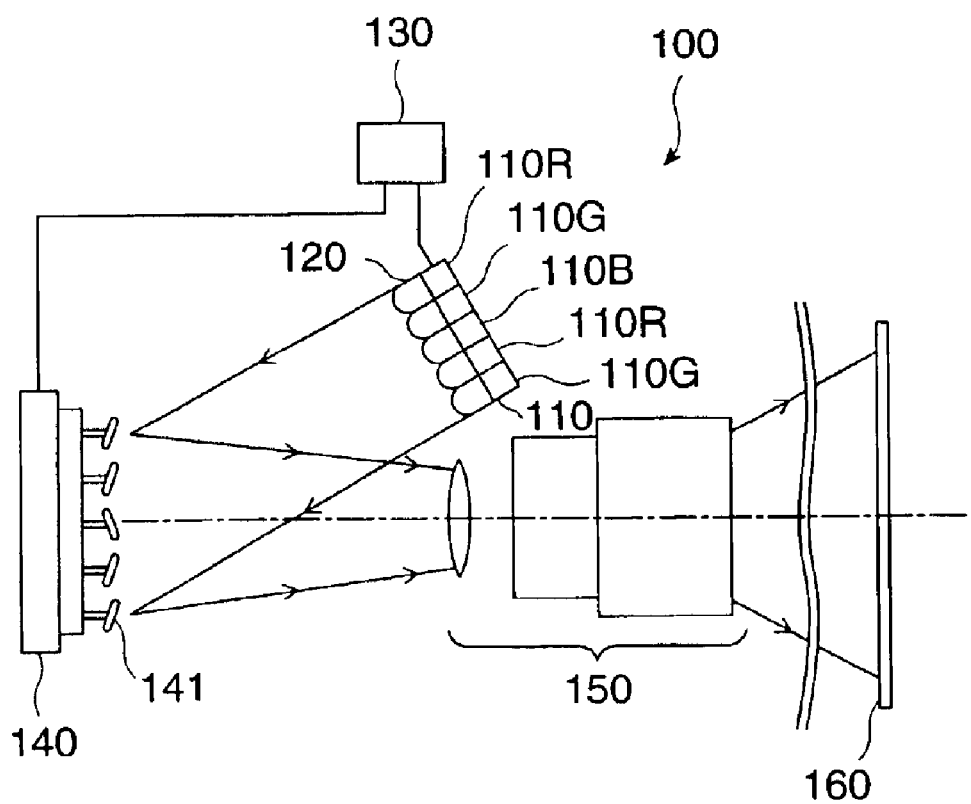
FIG. 8 is a drawing illustrating a summarized configuration of a projector having an image display device according to a third embodiment.

FIG. 8 is a drawing showing a summarized configuration of a projector 100 having an image display device according to a third embodiment of the present invention. A light-source 110 can include a G-ray light-emitting element 110G for supplying a G-ray, which is a first color-ray in a first wavelength region, an R-ray light-emitting element 110R for supplying an R-ray, which is a second color-ray in a second wavelength region different from the first wavelength region, and a B-ray light-emitting element 110B for supplying a B-ray. As these light-emitting elements, an LD, an LED, an organic EL element, and so forth are used.

Light from the R-ray light-emitting element 110R, the G-ray light-emitting element 110G, and the B-ray light-emitting element 110B enters a tilt-mirror device 140 via a fly-eye lens array 120. By the fly-eye lens array 120, light from the light-emitting elements for each color-ray 110R, 110G, and 110B illuminates the substantially entire region of the tilt-mirror device 140, which is a spatial light modulation device (spatial modulation element), respectively. The illumination with reduced unevenness can be thereby performed. A driving control unit 130 drives and controls the light-emitting elements for each color-ray 110R, 110G, and 110B and the tilt-mirror device 140. This driving control will be described in greater detail below.

The surface of the tilt-mirror device 140 is provided with a plurality of movable mirror elements 141 arranged thereon. The movable mirror element 141 is rotatable around a predetermined shaft (not shown). Then, the movable mirror element 141 is inclined about the predetermined shaft as a center so as to selectively have two positional states of a first reflection position and a second reflection position.

The driving control unit 130 drives the movable mirror element 141 corresponding to an image signal to between the first reflection position and the second reflection position, which is substantially symmetrical with the first reflection position about the predetermined shaft. For example, if the movable mirror element 141 is located at the first reflection position, the reflected light from the movable mirror element 141 proceeds in a direction incident in a projection lens system 150. The incident light in the projection lens system 150 is projected on a screen 160.

Whereas, if the movable mirror element 141 is located at the second reflection position, the reflected light from the movable mirror element 141 proceeds in a direction other than that of the projection lens system 150. Thereby, when the movable mirror element 141 is located at the second reflection position, the reflected light is not projected on the screen 160. As a result, by the tilt-mirror device 140, incident light can be modulated and reflected corresponding to an image signal.

The turning-on period and timing of the R-ray light-emitting elements 110R, the G-ray light-emitting element 110G, and the B-ray light-emitting elements 110B for obtaining full-color images will now be described.

According to the embodiment, it is different from the first and second embodiments that one light source 110 is provided on one side of the projection lens 150. The turning-on period and timing according to the embodiment are the same as those described with reference to FIGS. 5(a) and 5(b), through the driving polarity inversion time signal in FIG. 5(a) is not necessary in this embodiment. The driving control unit 130 serving also as a light source driver turns on the R-ray light-emitting element 110R, the G-ray light-emitting element 110G, and the B-ray light-emitting element 110B by sequentially switching them. Within one frame of displayed images, the turning-on period of each color-ray light-emitting element is differentiated. The luminous flux amount can be thereby set arbitrarily. As a result, a compact and bright image display device using a spatial modulation element can be provided. Also, even when the luminous flux amount of each light source is different, more bright images can be displayed.

In order to obtain white light, as described above, it is necessary that the luminous flux amount of the G-ray be about 60% to 80% of the entire luminous flux amount. Therefore, a turning-on period GT of the G-ray light-emitting element 110G is increased longer than a turning-on period RT of the R-ray light-emitting element 110R and a turning-on period BT of the B-ray light-emitting element 110B. Thereby, even the G-ray light-emitting elements 110G, the R-ray light-emitting elements 110R, and the B-ray light-emitting elements 110B are the same in power and the number, the luminous flux amount of the G-ray necessary for obtaining white light can be obtained while the light source is being miniaturized.

A case where the number of the G-ray light-emitting elements 110G, the R-ray light-emitting elements 110R, and the B-ray light-emitting elements 110B are substantially the same is now discussed. In this case, the spatial expanses of the light-sources for each color are substantially the same. However, in order to obtain white light, as described above, it is necessary that the luminous flux amount of the G-ray be about 60% to 80% of the entire luminous flux amount. Therefore, the G-ray light-emitting elements 110G are turned on for a period longer than the other light-emitting elements, so as to increase a gradation-expressing period GK of the G-ray longer than a R-gradation expressing period RK and a B-gradation expressing period BK. Thereby, even the G-ray light-emitting elements 110G, the R-ray light-emitting elements 110R, and the B-ray light-emitting elements 110B are the same in power and the number, the luminous flux amount of the G-ray necessary for obtaining white light can be obtained while the light source is being miniaturized.

In this case, if the gradation of images is designated with n-bits (n is a positive integer), the unit-bit length of the G-gradation-expressing period GK is different from the unit-bit length of the R-gradation-expressing period RK or the B-gradation-expressing period BK. Thereby, appropriate gradation expression can be performed in each color-ray.

Also, the driving control unit 130 can differentiate a frequency of a G-ray light-source driving clock signal when driving the G-ray light-emitting elements 110G from a frequency of a second color-ray light-source driving clock signal when driving the R-ray light-emitting elements 110R or the B-ray light-emitting elements 110B. Thereby, appropriate light-source driving can be performed in each color-ray.

Furthermore, preferably the G-ray light-source driving clock signal and the second color ray light-source driving clock signal further have a unit clock signal with a frequency common to both the signals. Thereby, the driving circuit can be simplified.

Figure 9:
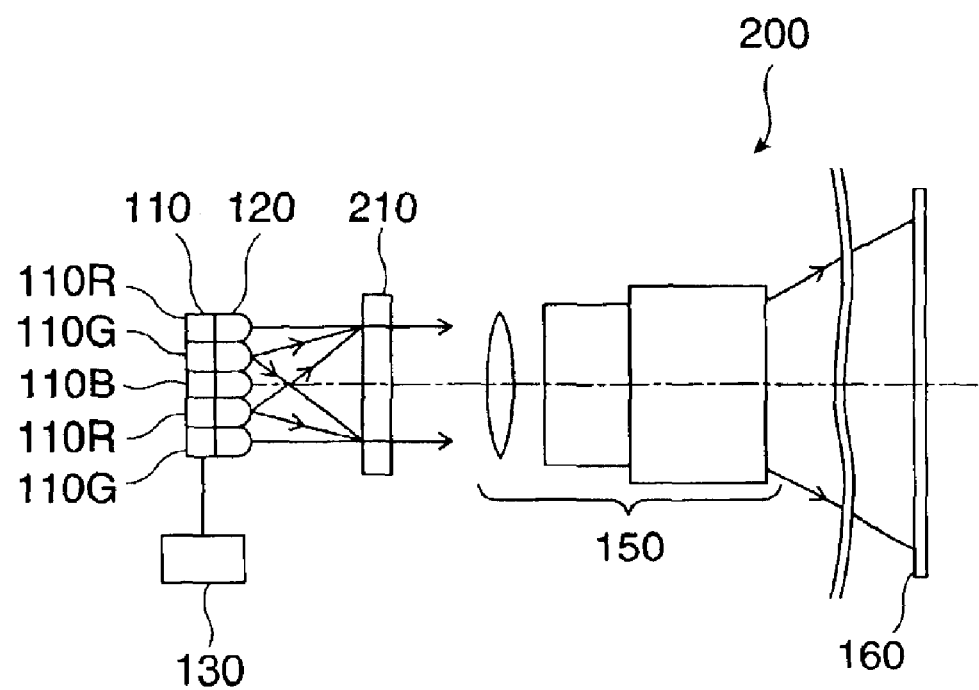
FIG. 9 is a drawing illustrating a summarized configuration of a projector having an image display device according to a fourth embodiment.

FIG. 9 is a drawing showing a summarized configuration of a projector 200 having an image display device according to a fourth embodiment of the present invention. It is different from the third embodiment described above that a transmissive liquid crystal light valve 210 is used as a spatial modulation element. Like reference characters designate like other portions common to the first embodiment and tautological description is omitted.

Figure 5:
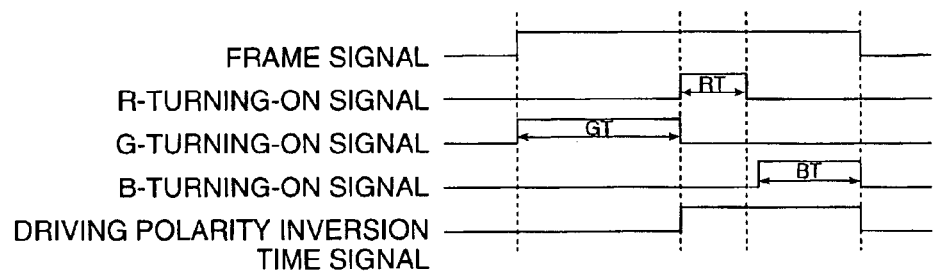
FIG. 5 is a drawing showing turning-on periods and timing.
Figure 5:
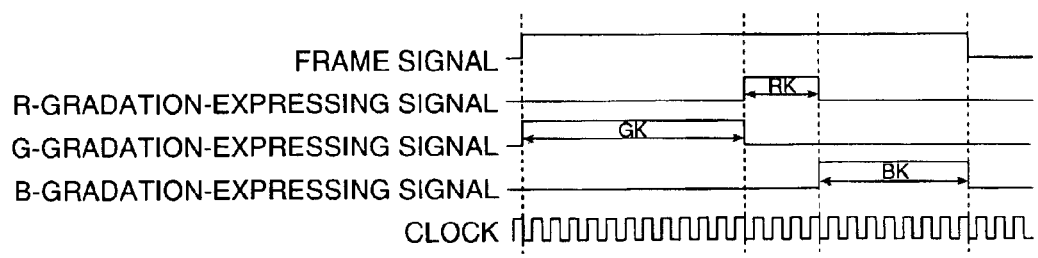

The light source 110 turns on the light-emitting elements for each color-ray 110R, 110G, and 110B with the timing shown in FIG. 5. Light from these light-emitting elements illuminates a transmissive liquid crystal light valve 210 uniformly via the fly-eye lens array 120. Light incident in the transmissive liquid crystal light valve 210 is modulated and emitted by being transmitted or non-transmitted (shielded) corresponding to an image signal. The modulated light from the transmissive liquid crystal light valve 210 is projected on the screen 160 via the projection lens system 150.

Figure 10:
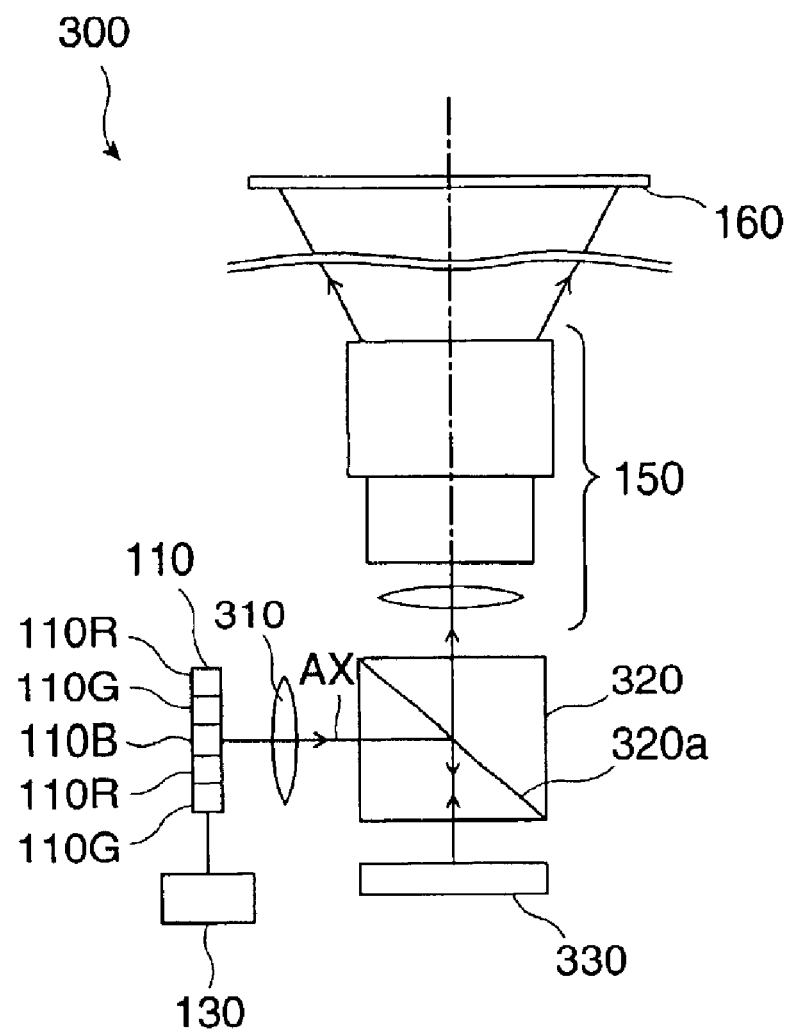
FIG. 10 is a drawing illustrating a summarized configuration of a projector having an image display device according to a fifth embodiment.

FIG. 10 is a drawing showing a summarized configuration of a projector 300 having an image display device according to a fifth embodiment of the present invention. It is different from the fourth embodiment described above that a reflective liquid crystal light valve is used as a spatial modulation element. Like reference characters designate like other portions common to the fourth embodiment and a detailed description is omitted.

The light source 110 turns on the light-emitting elements for each color-ray 110R, 110G, and 110B with the timing shown in FIG. 5. Light from these light-emitting elements is converted into S-polarization light by a polarization changer (not shown). Then, the S-polarization light is reflected on a polarization surface 320a of a polarization beam splitter 320. The polarization surface 320a has an angular response about the polarization split. Therefore, principal light beams from the light-emitting elements for each color-ray 110R, 110G, and 110B are converted by a lens 310 so as to be substantially in parallel with an optical axis AX. The light reflected on the polarization surface 320a enters a reflective liquid crystal light valve 330.

The reflective liquid crystal light valve 330 modulates the S-polarization light into a P-polarization light so as to be emitted corresponding to an image signal. The P-polarization light, which is modulated light, is detected by transmission through the polarization surface 320a of the polarization beam splitter 320. On the other hand, the S-polarization light, which is non-modulated light, is reflected on the polarization surface 320a toward the light source 110 and is discarded. Whereas, the modulated light is projected on the screen 160 by the projection lens system 150. Bright full-color images can be thereby projected with a compact light source.

Figure 11:
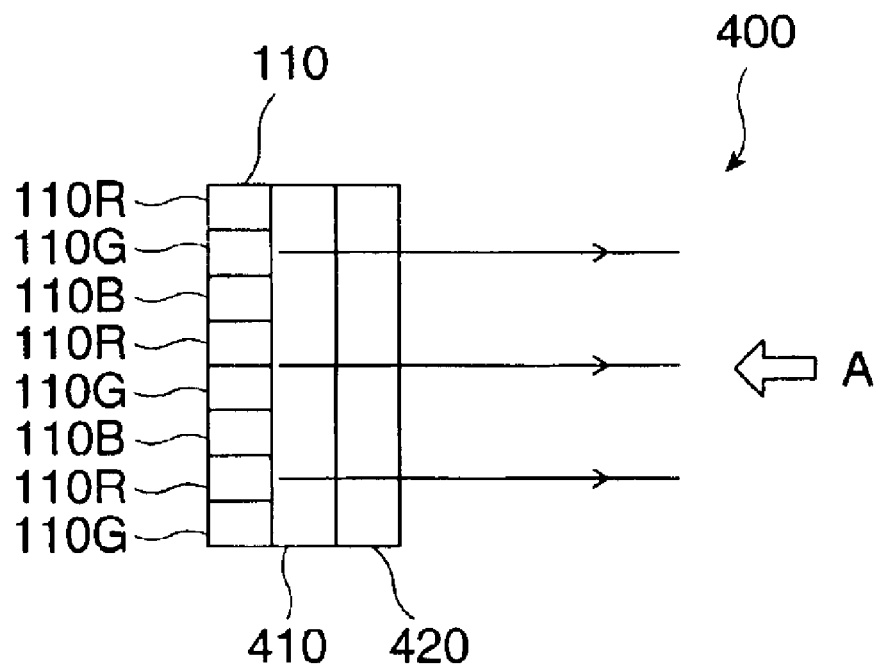
FIG. 11 is a drawing illustrating a summarized configuration of a projector having an image display device according to a sixth embodiment.

FIG. 11 is a drawing showing a summarized configuration of an image display device 400 according to a sixth embodiment of the present invention. Like reference characters designate like other portions common to the embodiments described above and a detailed description is omitted. According to the embodiment, a direct-viewing image display device is provided. Each color-ray from the light source 110 enters a light-guide plate 410 as a backlight ray. The backlight ray enters a transmissive liquid crystal light valve 420 as a spatial modulation element via the light-guide plate 410. The transmissive liquid crystal light valve 420 modulates incident light to be emitted by transmission or non-transmission thereof corresponding to an image signal. Thereby, full-color images can be obtained when being viewed in the direction A.

A projector having a solid light-emitting element, such as a light-emitting diode, as a light source according to a seventh embodiment will be described. In the light source having the solid light-emitting element, the life of the light source itself is long and maintenance due to a burned-out light bulb is not necessary. Furthermore, since the response speed in on-off switching of the solid light-emitting element is fast, color balance can be adjusted by the adjustment of on-off timing for each color. Also, different from a white light source, a color filter is not necessary and light is efficiently utilized without noise. Therefore, by adopting the solid light-emitting element as a light source, a compact projector capable of projecting high-quality bright color images can be provided.

However, light quantity of the individual solid light-emitting elements is not enough to project images, so that it is preferable to arrange a plurality of solid light-emitting elements for acquiring sufficient quantity of light. Since each individual solid light-emitting element is a semiconductor light-emitting element, it is small in size, so that the light quantity necessary for an illumination device may be provably obtained by arranging a plurality of the elements two-dimensionally in an array or in a matrix arrangement. However, since each individual solid light-emitting element has an area, although it is small in size, if a number of solid light-emitting elements are arranged for acquiring quantity of light, the area of a light-emitting region of the illumination device is consequently increased, and an optical system for condensing the illumination luminous flux from the illumination device on a light valve is also increased in size and complicated, so that advantages of the solid light-emitting element are reduced. Furthermore, in the optical system for condensing the illumination luminous flux, various aberrations, such as astigmatism and chromatic aberration, may be produced so that it becomes rather difficult to project clear color images. Accordingly, in order to project compact images with sufficient brightness, it is preferable that light from the limited number of the solid light-emitting elements be efficiently illuminated on the spatial modulation device (light valve), and the light modulated by the spatial modulation device (light valve) be efficiently projected on a screen.

Figure 12:
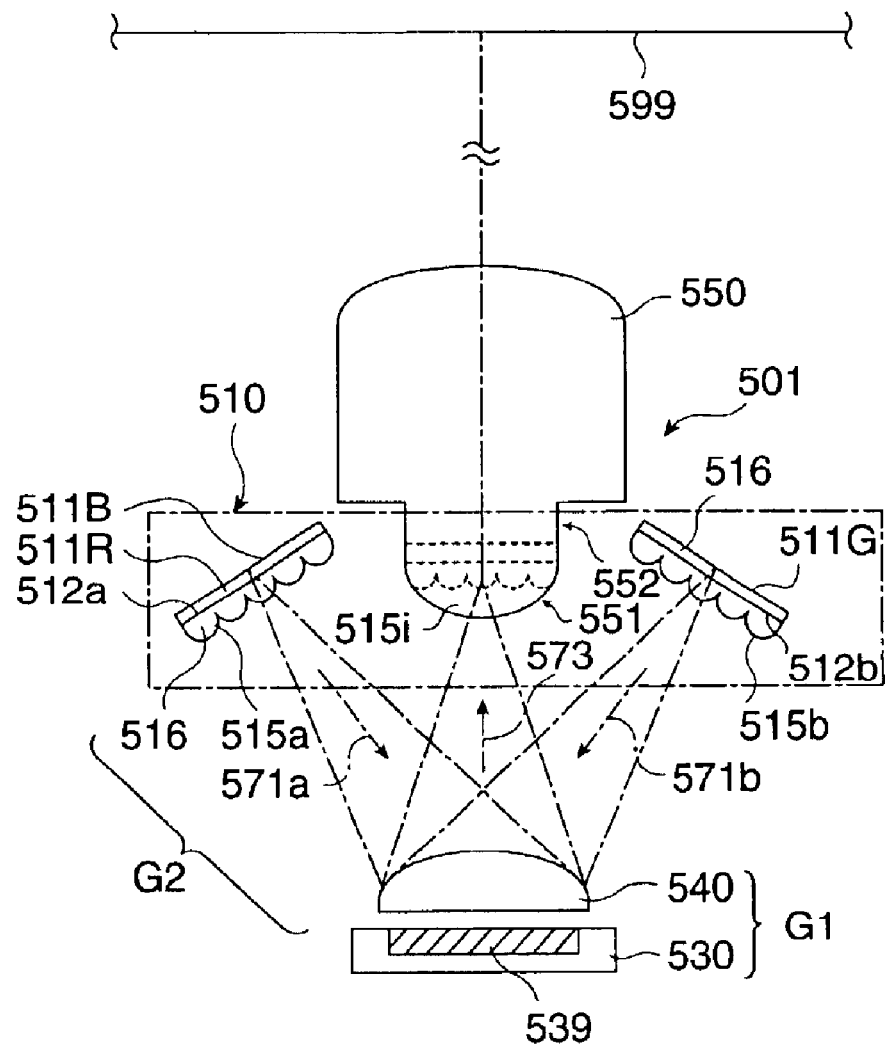
FIG. 12 is a drawing illustrating an outline of a projector according to a seventh embodiment using LED elements as a light source.

The embodiment according to the present invention will be described below with reference to the drawings. FIG. 12 shows a summarized configuration of a projector 501 according to the present invention having LED elements, which are solid light-emitting elements, used for a light emitting source. The projector 501 according to the embodiment can include a light source 510 having a plurality of the LED elements, a light valve 530, which is a reflection type spatial light modulation device, having a modulation region (reflection surface) 539 for forming images by switching an illumination luminous flux (incident luminous flux) 571a from the light source 510, and a projection lens 550 for projecting a display luminous flux 573, which is formed by modulating the illumination luminous flux 573, on a screen 599.

The reflection light valve 530 according to the embodiment is a micro-mirror device having a modulation region or an image-forming region 539 having tilt-mirror elements (switching elements), which are movable elements, each having a plurality of micro-rectangular and mirror-finished modulation surfaces (micro-mirrors), arranged in an array or a matrix arrangement. In each tilt-mirror element 532 constituting the modulation region 539, as shown in enlarged FIG. 13 identical to FIGS. 2(a) and 2(b), a micro-mirror 531 is rotatably supported on a semiconductor substrate 535 with a column 534, so that inclination of the micro-mirror 531 is to be controlled using a pair of address electrodes 536a and 536b disposed on the surface of the semiconductor substrate 535 as actuators. The micro-mirror 531 is rotated about the column 534 as a center from the horizontal position in a predetermined direction within a range of about ±10° so as to be an ON-position at each position. Therefore, the switching element 532 according to the embodiment can have two orientations 537a and 537b inclined about the column 534 in the right and left, so that if there is the illumination luminous flux 571 incident from the inclined direction, it is reflected in the direction toward the projection lens 550 as effective light, i.e., the display luminous flux 573.

In other words, with the illumination luminous flux 571a, when the switching element 532 is at an oriented state 537a, it is in an ON-state (a state of the reflected luminous flux incident in the projection lens), while being at an oriented state 537b, it is in an OFF-state (a state of the reflected luminous flux not incident in the projection lens).

Also, with the illumination luminous flux 571b, when the switching element 532 is at an oriented state 537b, it is in an ON-state (a state of the reflected luminous flux incident in the projection lens), while being at an oriented state 537a, it is in an OFF-state (a state of the reflected luminous flux not incident in the projection lens).

The projector 501 according to the embodiment can further include a field lens 540 with positive refracting power, which is arranged close to the projection lens 550 in the vicinity of the light valve 530 so that the illumination luminous flux 571 and the display luminous flux 573 pass therethrough. That is, the field lens 540 is located in between the projection lens 550 and the light valve 530. Also, the field lens 540 is positioned on an optical path connecting between the projection lens 550 and the light valve 530. To the illumination luminous flux 571, the field lens 540 functions condensing the illumination luminous flux 571 outputs from the light source 510 on the light valve 530, while to the display luminous flux 573, it functions condensing the display luminous flux 573 on the screen 599 together with the projection lens 550. Furthermore, between the light source 510 and the projection lens 550, an optical system is defined, which is constituted of the field lens 540 and the modulation region 539 of the reflection light valve 530. In this specification, this optical system is referred as a modulation optical system G1.

The light source 510 according to the embodiment can include two light-emitting regions 512a and 512b arranged by sandwiching an incident end of the projection lens 550 therebetween so as to be directed toward the field lens 540. The light-emitting regions 512a and 512b are substantially the same in shape and size; however, one light-emitting region (first light-emitting region) 512a is provided with a plurality of red LED elements (solid light-emitting elements) 511R and a plurality of blue LED elements 511B arranged thereon, while the other light-emitting region (second light-emitting region) 512b is provided with only a plurality of green LED elements 511G arranged thereon. When a plurality of micro-lenses 516 are provided close to the light valve 530 (in front or the emitting side) of the LED elements 511, and the plurality of micro-lenses 516 are arranged in an array or a matrix arrangement so that the respective LED elements 511 and the respective micro-lenses 516 correspond one-to-one, the entire of the plurality of micro-lenses 516 (i.e., a micro-lens array 515a and a micro-lens array 515b) correspond to the light-emitting regions 512a and 512b. On the other hand, when such a micro-lens array 515a and a micro-lens array 515b are not positioned on an optical path between the LED 11 and the light valve 530, the entire light emitting section 513 of the LED elements 511 corresponds to the light-emitting regions 512a and 512b.

An optical system (referred to as an illumination optical system in the specification) G2 constituted of the respective micro-lenses 516 and the field lens 540 guides the illumination luminous flux 571 from each of the LED elements 511 to the modulation region 539 of the light valve 530. On the other hand, the modulation optical system G1 including the field lens 540 and the light valve 530 guides the illumination luminous flux 571 from the light-emitting regions 512a and 512b (micro-lens arrays 512a and 512b according to the embodiment) to an entrance pupil 552 of the projection lens 550.

The light-emitting regions 512a and 512b are arranged in an optically conjugate relationship to the entrance pupil 552 of the projection lens 550 with the modulation optical system G1 including the field lens 540 and the light valve 530 therebetween. More specifically, the light-emitting regions 512a and 512b are located on a virtual plane optically conjugated to the entrance pupil 552 with the modulation optical system G1 including the field lens 540 and the light valve 530 therebetween. The entire rays are restricted by the entrance pupil 552 viewed from an incident side 551 of the projection lens 550. Therefore, by setting the light-emitting regions 512a and 512b so as to have a conjugate relationship to the entrance pupil 552 with the modulation optical system G1, through which the illumination luminous flux 571 passes before reaching the projection lens 550 after being output, conjugate images 515i of the light-emitting regions 512a and 512b are formed in the entrance pupil 552. That is, the entire illumination luminous flux 571a or 571b output from the light-emitting region 512a or 512b, except losses due to reflection and absorption of the field lens 540 and absorption of the light valve 530, enters the projection lens 550 via a screen 559 so as to be projected on the screen 599. Therefore, the illumination luminous fluxes 571*a* and 571*b* output from the light-emitting regions 512*a* and 512*b* are efficiently utilized for projecting images on the screen 599. Accordingly, the projector 501 capable of displaying most bright images with minimum areas of the light-emitting regions 512*a* and 512*b* can be provided.

Figure 13:
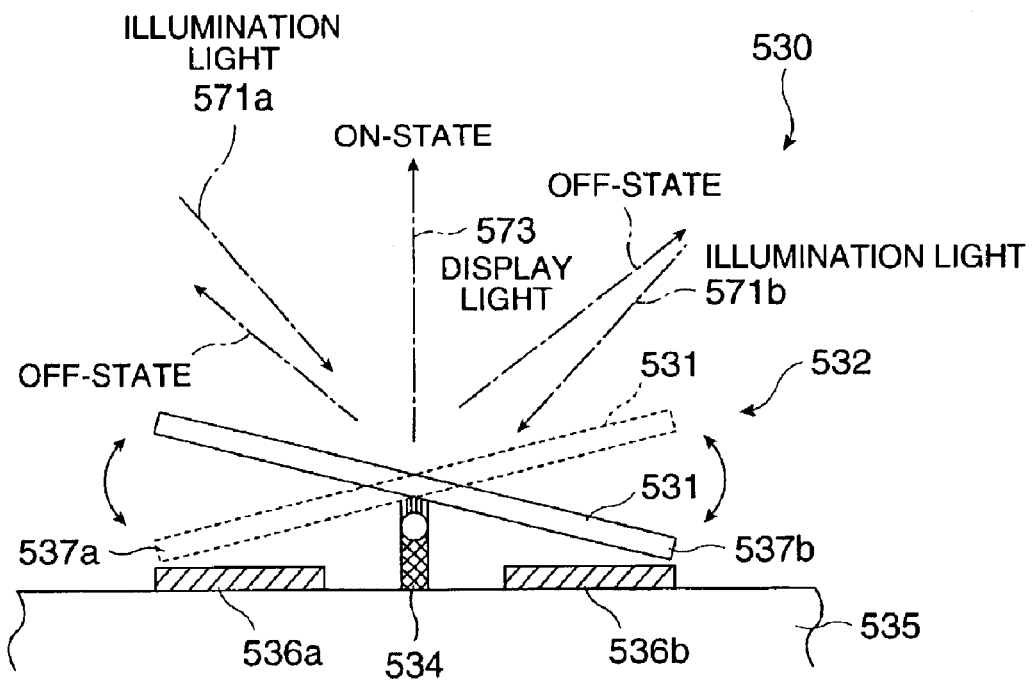
FIG. 13 is a drawing illustrating an outline of a tilt mirror element constituting a modulation region of a light valve shown in FIG. 12.
Figure 14:
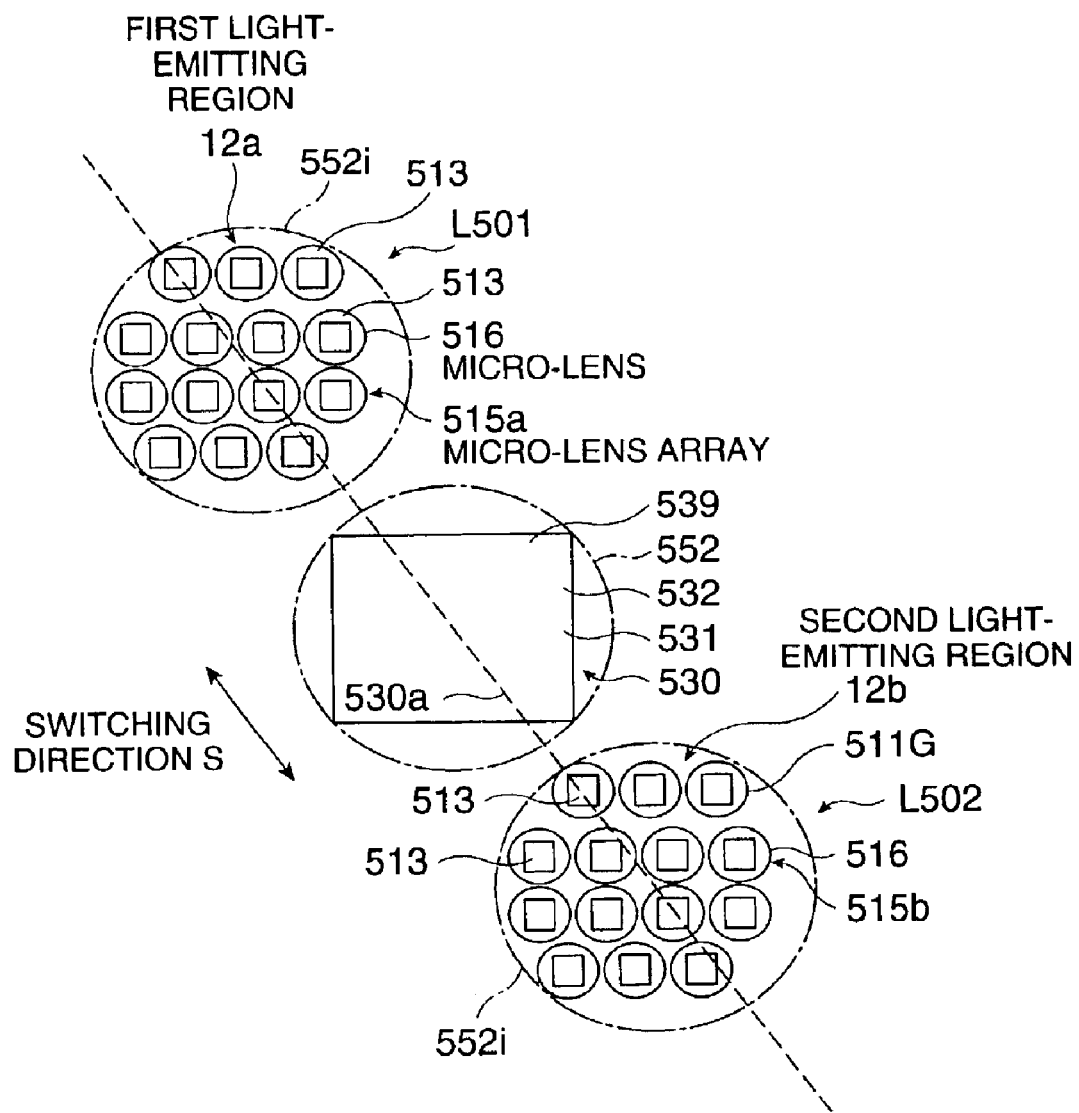
FIG. 14 is a drawing showing a schematic positional relationship between an entrance pupil and a light-emitting region in the projector shown in FIG. 12.

The switching element 532 constituting the modulation region 539 of the light valve 530, as described in FIG. 13, is provided with two positions 537*a* and 537*b*. Therefore, when the light valve 530 is turned ON, there are two positions conjugate to the entrance pupil 552. As shown in FIG. 14, positions L1 and L2, which are symmetrical about a rotating direction (switching direction) S of the micro-mirror 531 of the switching element 532 and sandwiching the entrance pupil 552 therebetween, are positions conjugated to the entrance pupil 552. That is, in the direction passing through the center 530*c* of the light valve 530 and being inclined at 45° relative to one side 530*a* of the light valve 530, the first and second light-emitting regions 512*a* and 512*b* are located. This direction inclined at 45° relative to the light valve 530 is the switching direction of the switching element 532 of the light valve 530, in which the micro-mirror 531 rotates, and is an incident direction of the illumination luminous flux 571. The ranges of images 552*i* of the entrance pupil 552 formed at the positions L1 and L2 conjugated to each other with the modulation optical system G1 therebetween are regions arranged in a conjugate relationship to the entrance pupil 552. Then, in the ranges of the images 552*i* conjugated to the entrance pupil 552 and formed symmetrical about the switching direction S, the LED elements 511R and 511B/511G are arranged to form the first and second light-emitting regions 512*a* and 512*b*, respectively.

Accordingly, the projector 501 according to the embodiment can be provided with the first and second light-emitting regions 512*a* and 512*b* conjugated to the entrance pupil 552 of the projection lens 550 by arranging the field lens 540 with a convex lens effect and positive refracting power in the vicinity of the light valve 530. Furthermore, by arranging the LED elements 511R and 511B/511G on these regions 512*a* and 512*b*, respectively, light emitted from a plurality of the LED elements can efficiently enter the projection lens 550.

Recently, LED elements with high brightness and high power have been put in practical application for various light sources, including the blue LED elements 511B in particular. However, although advances toward high brightness have made a progress, light quantity of the individual LED element is small in comparison with a conventional white lamp, so that it is preferable to arrange a plurality of the LED elements for acquiring sufficient quantity of light necessary for the projector 501. Even when a number of the LED elements are arranged, if substantially the entire light output therefrom is not used for projecting images to a screen, this is wasteful and results in increased power consumption and size.

Whereas, in the projector 501 according to the embodiment, the LED elements 511 are arranged on the regions 512*a* and 512*b* conjugated to the entrance pupil 552, so that light emitted from the LED elements 511 is not wastefully used and efficiently utilized. Accordingly, the highly compact and energy-saving projector 501 capable of projecting brightest images can be achieved.

In the light valve 530 according to the embodiment, since there are two regions conjugated to the entrance pupil 552, on any one of the regions, the LED elements 511R, 511G, and 511B may also be arranged. Even in this case, light emitted from the respective LED elements efficiently enters the projection lens 550, enabling a compact projector capable of projecting bright images to be achieved by using light efficiently. However, if both the conjugate regions 512*a* and 512*b* are used, the area for arranging the LED elements 511 is doubled, enabling further bright images to be displayed.

On the regions 512*a* and 512*b*, the LED elements 511R (red), 511G (green), and 511B (blue) may be arranged at the same rate, wherein by controlling two ON-states 537*a* and 537*b* of the switching element 530 simultaneously with each color-ray from two regions 512*a* and 512*b* emitted in a time-shared system, multi-color images can be displayed. Since the illumination luminous fluxes 571*a* and 571*b* are respectively emitted from the two-way regions 512*a* and 512*b*, if the number of switching elements 532 corresponding to each color-ray or at least two color-rays are prepared on the modulation region 539, two-color images can also be output simultaneously.

Whereas if specific color-ray LED elements 511 are gathered and arranged on one light-emitting region 512*a* or 512*b*, the ON oriented states 537*a* and 537*b* may be controlled for each color, so that the control of the switching elements 532 is extremely simplified, enabling bright images to be displayed with the small number of the switching elements. In order to output multi-color (full-color) images, it is preferable that a balance of the number of light-emitting elements for each color be set to have white light in view of spectral luminous efficiency. The spectral luminous efficiency is very small for green, and the power of the green-ray LED element 511G has not been improved enough to cover the spectral luminous efficiency. Therefore, according to the embodiment, the green-ray LED elements 511G with the low spectral luminous efficiency are independently arranged on the second light-emitting region 512*b*, while the red-ray LED elements 511R and the blue-ray LED elements 511B are arranged on the first light-emitting region 512*a*, so as to acquire the color balance.

As is disclosed in this specification, the respective light-emitting regions 512*a* and 512*b* are located on visual planes conjugated to the entrance pupil 552. Therefore, if the LED elements 511 are efficiently arranged on the conjugated images 552*i* of the entrance pupil 552 produced on the conjugated virtual planes, the illumination luminous flux 571 output from the LED elements 511 can be efficiently utilized for projecting images without being wasted. Accordingly, in order to display bright images, shapes of the light-emitting regions 512*a* and 512*b* may be brought into agreement with shapes of the conjugated images 552*i*, respectively.

In FIG. 14, the light-emitting regions 512*a* and 512*b* are located within ranges of the conjugated images 552*i* of the entrance pupil 552. Most preferably, the conjugated images 552*i* of the entrance pupil 552, i.e., ranges within circles indicated by dotted lines in FIG. 14 may be filled with the LED elements 511 including the micro-lenses 516.

Figure 15:
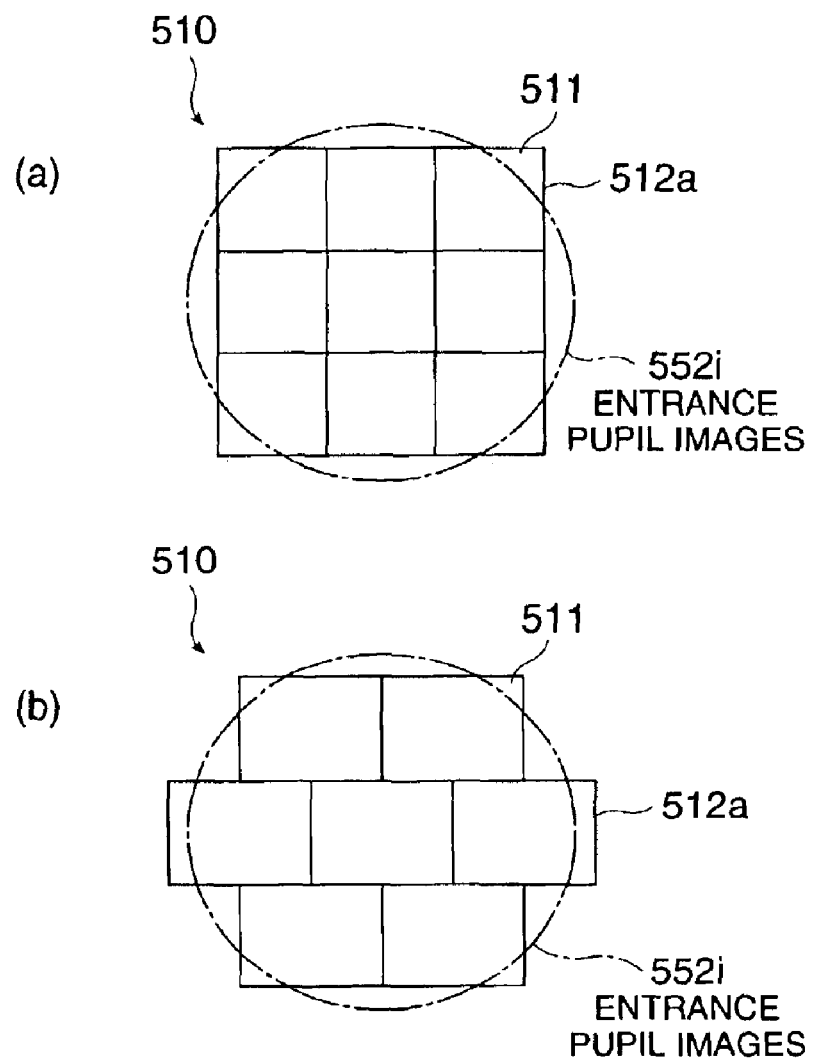
FIG. 15 is a drawing showing an example of arranging LED elements on a light-emitting region.

In an arrangement shown in FIG. 15(*a*), the LED elements 511 are arranged in an array on the first light-emitting region 512*a* so as to fill the images 552*i* of the entrance pupil with the LED elements 511. Since part of the light-emitting region 512*a* of the LED elements 511 is protruded out of the conjugated images 552*i*, wasteful light is produced. Although part of the conjugated images 552*i* is not overlapped on the light-emitting region 512*a*, in this arrangement, a number of the LED elements 511 can be easily arranged methodically.

FIG. 15(b) shows an arrangement of the LED elements 511 where the elements are horizontally or vertically shifted by a half pitch (may be less than a half pitch). In this arrangement, although arranging a number of the LED elements 511 takes time and effort, the substantially entire images 552i of the entrance pupil can be filled with the LED elements 511, so that there are scarcely protruded elements out of the images 552i of the entrance pupil. Therefore, wasteful illumination fluxes can be reduced to the minimum, so that this arrangement is suitable for providing a compact projector capable of displaying bright images.

As described above, on the first and second light-emitting regions 512a and 512b, which are conjugated to the entrance pupil 552 with the modulation optical system G1 including the field lens 540 and the light valve 530, the LED elements 511 are arranged, so that the illumination flux 571 can be prevented from being wasted and the compact projector 501 capable of displaying bright images can be provided. However, in focusing attention on individual LED elements 511, there is dispersion in the light power output from the individual LED elements 511.

First, according to the embodiment, in front of the LED elements 511R, 511G, and 511B arranged on the first and second light-emitting regions 512a and 512b of the light source 510, the micro-lens array 515 is arranged so that the light emitting sections 513 of the LED elements 511 are conjugated to the modulation region 539 of the light valve 530 with the illumination optical system G2 therebetween, which includes the micro-lens 516 constituting the micro-lens array 515 and the field lens 540. In the individual LED elements 511, the light emitting section 513 is conjugated to the modulation region 539, so that the modulation region 539 is efficiently illuminated with the illumination luminous flux 571 emitted from the light emitting section 513. Therefore, even in a microscopic region of the individual LED element 511, light output from the LED element 511 can be prevented from being wasted, enabling a compact projector 501 capable of displaying more bright images to be provided.

Furthermore, since each of the light emitting section 513 is conjugated to the modulation region 539, the entire modulation region 539 is illuminated with the illumination luminous flux 571 emitted from the light emitting section 513 of the individual LED element 511. Accordingly, the individual difference of light power output from the individual LED element 511 is cancelled, so that the modulation region 539 can be efficiently illuminated with a plurality of LED elements 511 further without dispersion. Therefore, the images projected to the screen 599 can be improved not only in brightness but also in image quality by eliminating image dispersion.

In the case where the micro-lens 516 is spherical, for the conjugated relationship between the individual light emitting section 513 and the modulation region 539, it is preferable that the shape of the individual light emitting section 513 be analogous to that of the modulation region 539. That is, it is preferable that the length-and-breadth ratio (aspect ratio) of the light emitting section 513 be identical to that of the modulation region 539. It is also preferable that one side 539a of the modulation region 539 be arranged in parallel to the crosswise side 513a of the light emitting section 513. Therefore, according to the embodiment, the LED elements 511, each having a rectangular light emitting section 513 with a size of about 2 mm×3 mm, are arranged on the first and second light-emitting regions 512a and 512b.

It should be understood that the shape of the individual light emitting section 513 is not limited to be analogous to that of the modulation region 539. For example, as shown in FIG. 16, even in the LED element 511 having a rectangular light emitting section 513 with a size of about 2 mm×2 mm, by adopting a cylindrical micro-lens 516 producing astigmatism, the light emitting section 513 can be conjugated to the modulation region 539.

Figure 16:
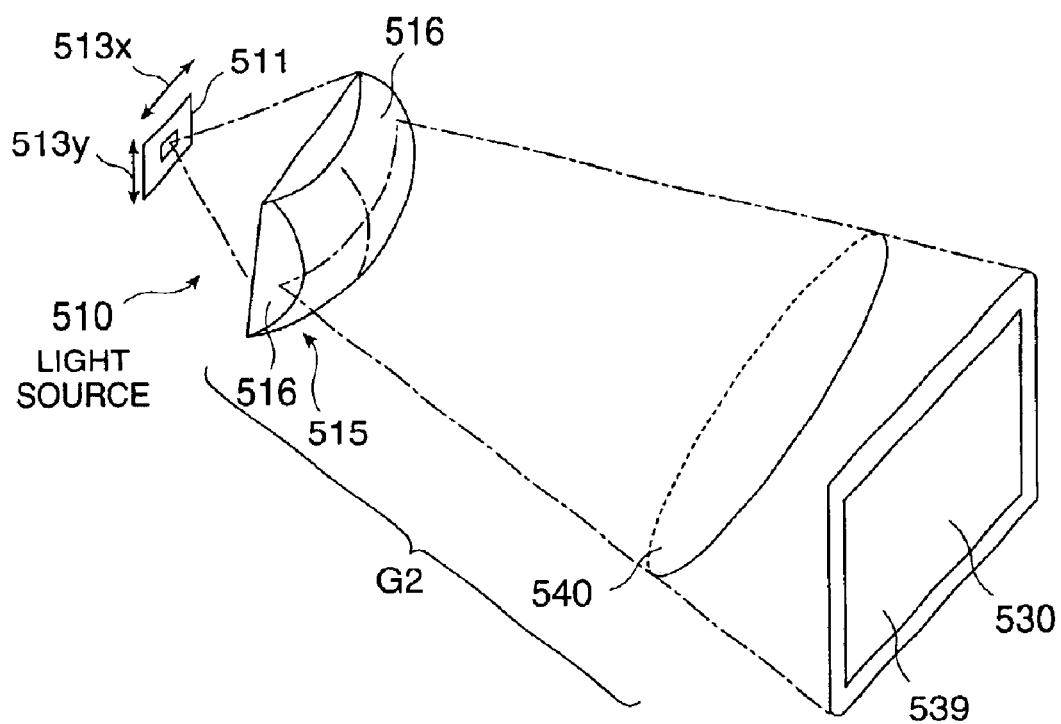
FIG. 16 is a drawing showing another example of a micro-lens.

The micro-lens 516 shown in FIG. 16 is formed to be different in lengthwise and lateral curvatures or magnification, and when passing through the illumination optical system G2, the cross-section of the illumination luminous flux 571 becomes rectangular, so that the entire modulation region 539 of the light valve 530 is illuminated therewith. Since the micro-lens 516 produces astigmatism, the image-formation position in the lengthwise direction does not agree with that in the lateral direction.

However, if the illumination optical system G2 is designed so as to arrange the light valve 530 between the image-formation position in the lengthwise direction 513y of the light emitting section 513 and the image-formation position in the lateral direction 513x of the light emitting section 513, the substantially entire modulation region 539 can be illuminated with the illumination luminous fluxes 571 emitted from the individual light emitting sections 513, suppressing the illumination luminous flux from being wasteful to the minimum.

Figure 17:
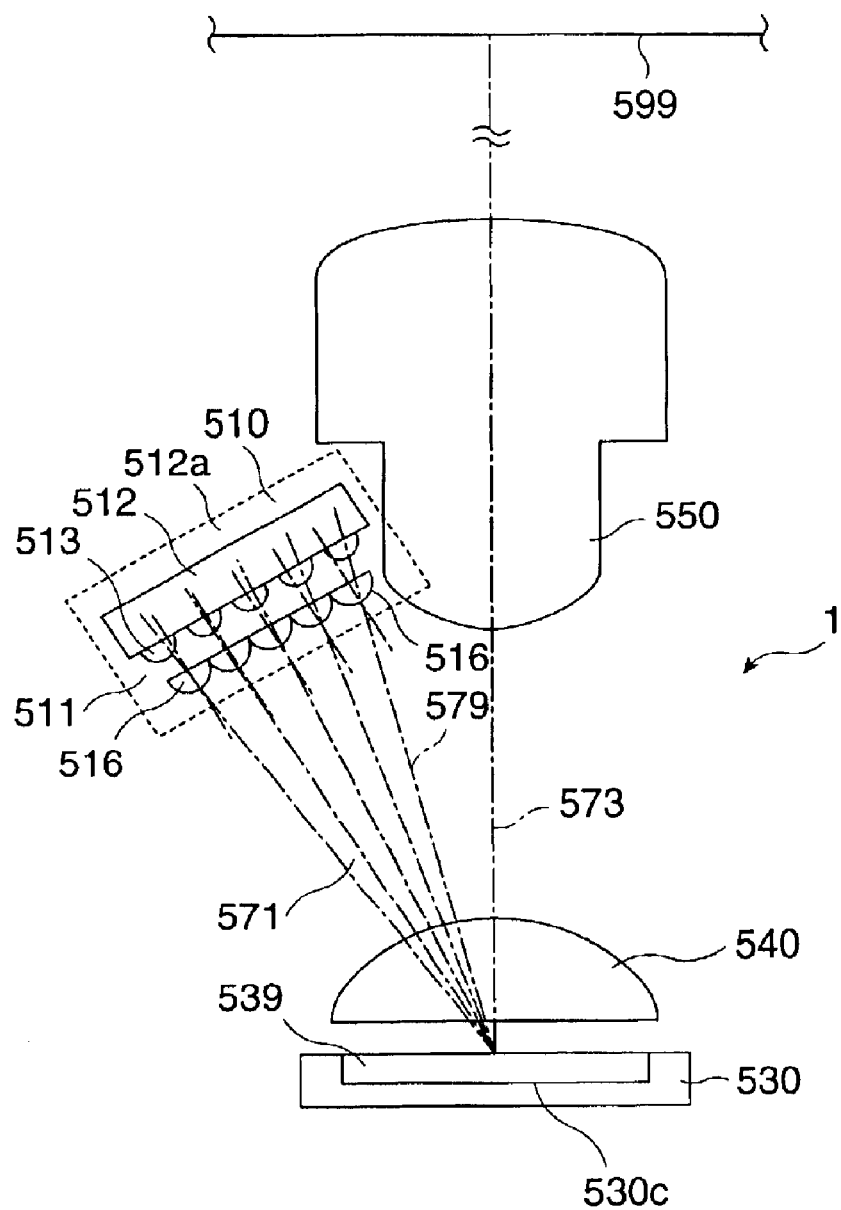
FIG. 17 is a drawing illustrating an outline of a projector in which illumination luminous fluxes are overlapped by shifting an optical axis of a micro-lens.
Figure 18:
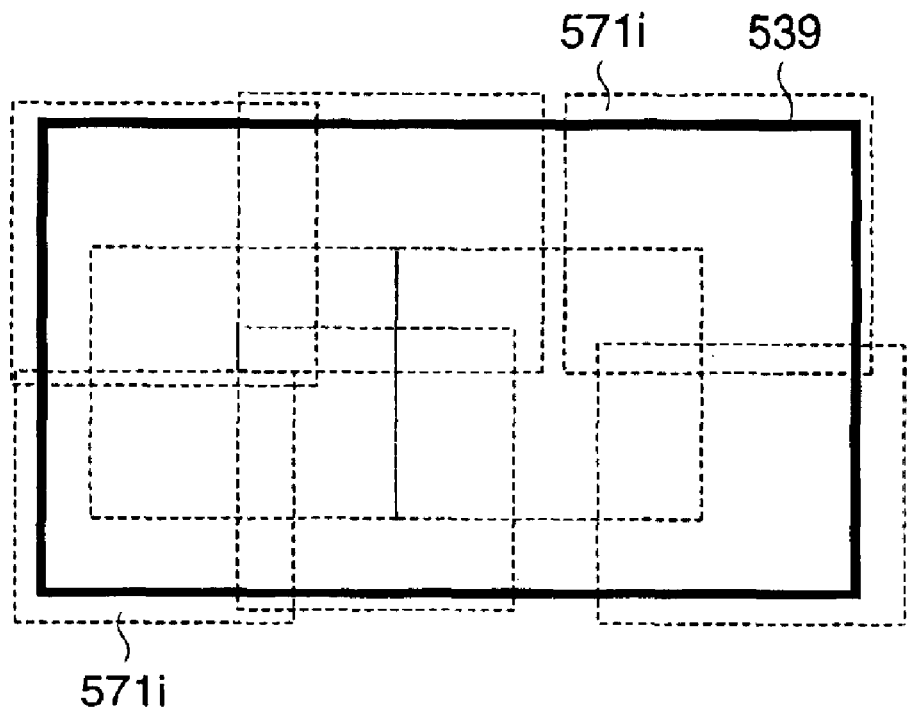
FIG. 18 is a drawing showing a state illuminating a modulation region with illumination luminous flux with a shifted optical axis so as to be overlapped.

It is preferable to illuminate the entire modulation region 539 with the individual LED elements 511 by conjugating the light emitting sections 513 of the individual LED elements 511 to the modulation region 539, in such a manner. However, it should be understood that the present invention is not limited to this, in view of prevention from wasting the illumination luminous fluxes 571 emitted from the individual LED elements 511. For example, in the case where each of the LED elements 511 has an extremely microscopic and square light-emitting section 513 with a size of about 1 mm×1 mm, for example, it is difficult to conjugate the light emitting sections 513 to the modulation region 539 in the illumination optical system G2. However, in the case where the light-emitting section 513 is square or rectangular, there are advantages for each case. In the case where the entire modulation region 539 cannot be illuminated with images from the light-emitting sections 513 of the individual LED elements 511, as shown in FIG. 17, by appropriately shifting optical axes 579 of the LED elements 511 and the micro-lenses 516 paired therewith for each pair or for each appropriate group, the modulation region 539 can be illuminated so that images 571i of the light-emitting sections 513 overlap the modulation region 539, as shown in FIG. 18. At this time, if the microscopic light-emitting surface 513 is square, since the images 571i formed on the modulation region 539 are also square, it is easy to align a side of the modulation region 539 with a side of the images 571i of the light-emitting section 513, preventing the illumination luminous flux 571i from being wasteful.

If the light-emitting section 513 is analogous to the modulation region 539 or is rectangular close thereto, by aligning the longitudinal side of the light-emitting section 513 with the longitudinal side of the modulation region 539, the shape of the modulation region 539 can be easily aligned with the entire cross-section of the illumination luminous flux 571 supplied from the light-emitting region 512a, enabling efficient illumination to be performed. For this purpose, the LED elements 511 are necessary to be arranged so that the longitudinal side of the light-emitting section 513 is to be parallel with the longitudinal side of the modulation region 539.

Even in the case where the individual light-emitting sections 513 are not conjugated to the modulation region 539 with the illumination optical system G2 therebetween, in such a manner, by forming the light-emitting section 513 to be square, or more preferably to be rectangular and analogous to the modulation region 539, wasteful light can be prevented from being produced by aligning edges of the illumination luminous flux 571. Furthermore, even in the projector without the field lens 540 arranged therein, by conjugating the light-emitting section 513 to the modulation region 539 with the illumination optical system G2 (only the micro-lens 516 in this case) therebetween, an advantage of eliminating wasteful illumination luminous flux is offered. Therefore, a projector capable of displaying bright images can be provided even if it is compact and energy efficient. Also, even in the case where the light-emitting section 513 is not conjugated to the modulation region 539 with the illumination optical system G2, by forming the shape of the light-emitting section 513 to be square, or to be rectangular and analogous to the modulation region 539, wasteful illumination luminous flux can be prevented as described above.

Figure 19:
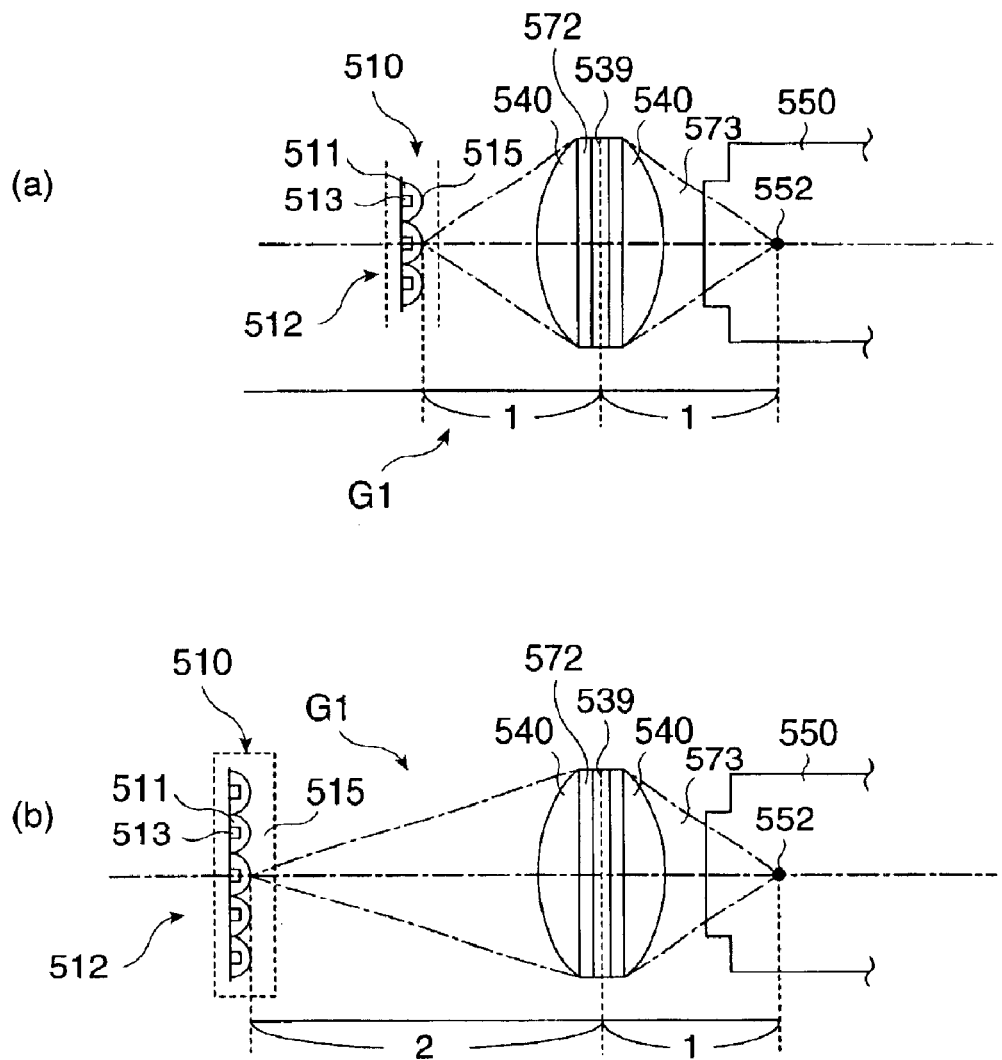
FIG. 19(a) is a drawing showing a case where a magnification of a modulation optical system is 1.
FIG. 19(b) is a drawing showing a case where a magnification of the modulation optical system is less than 1.

The above-described example, as shown in FIG. 19(a) by extending the modulation optical system G1 toward the illumination luminous flux 571 and the display luminous flux 573, is described based on a modulation optical system with the magnification of 1:1 between the illumination luminous flux, i.e., incident side, and the display luminous flux, i.e., emitting side. In this modulation optical system G1, the luminous flux 571 is to be parallel in between the field lens 540 in the incident side and the field lens 540 in the emitting side (identical to the incident side). Therefore, the illumination luminous flux 571 illuminating the modulation region 539 becomes telecentric, facilitating to perform switching by changing the angle of the micro-mirror 531. That is, since not only the effective light obtained from the micro-mirror, but also non-effective light becomes parallel, the effective light can be separated from the non-effective light by an extremely small angle. Alternatively, the incident diameter of the projection lens 550 can be increased within the range of not taking the non-effective light therein, enabling more bright images to be displayed.

On the other hand, as shown in FIG. 19(b), the modulation optical system G1, in which the magnification of the emitting side is not identical to that of the incident side, can be adopted. However, in the modulation optical system G1, in which the magnification of the emitting side relative to the incident side is 1 or more, the light source 510 is located closer to the light valve 530 than the projection lens 550. On the other hand, in the modulation optical system G1, in which the magnification of the emitting side relative to the incident side is less than 1, ½ (0.5 times) for example, the illumination luminous flux 571 from the light source 510 is contracted by the field lens 540 so as to converge on the entrance pupil 552 of the projection lens 550. Therefore, the area of the light-emitting region 512a or 512b is inversely increased relative to the entrance pupil 552, so that the light power of the illumination luminous flux 571 can be increased by arranging the more number of the LED elements 511. On the other hand, the modulation region 539 is illuminated with convergent light different from parallel light, so that effective light and non-effective light are not in parallel therewith. However, as long as it is within the allowable range in design that the aperture of the projection lens 550 can omit the non-effective light, there is no problem in image quality. Also, although depending on an F-number of the projection lens 550, the lightness of the lens may be possibly unchanged.

As described above, the projector 501 according to the embodiment is arranged so that the light source 510 is constituted of the LED elements 511R, 511G, and 511B, which are the solid light-emitting elements, and the light-emitting region 512 having a plurality of the LED elements arranged thereon is conjugated to the entrance pupil 552 of the projection lens 550 with the modulation optical system including the field lens 540 therebetween. Therefore, wasteful illumination luminous flux emitted from the light-emitting region 512 can be eliminated, so that there can be provided a compact and energy saving projector capable of displaying bright images with high quality by taking advantages of the solid light-emitting element.

As described above, the light valve (the spatial light modulation device) 530 according to the embodiment is a micro-mirror device or tilt-mirror device. As such a micro-mirror device or tilt-mirror device, a DMD (digital micro-mirror device) may be incorporated. The DMD is a device manufactured by Texas Instruments, Inc. According to the embodiment, the micro-mirror device is used for the light valve. However, it should be understood that the present invention is not limited to this, and another light valve such as reflective liquid crystal may be used. Also, the LED element is adopted as the solid light-emitting element. Alternatively, other solid or semiconductor light-emitting elements such as an organic EL and semiconductor laser may be used. As described above, according to the present invention, there can be provided a projector using the solid light-emitting element as the light source and being capable of efficiently guiding the illumination luminous flux emitted from the solid light-emitting element to the projection lens. Therefore, it is possible to provide a projector capable of efficiently illuminating the light valve with the minimum configuration and also capable of projecting bright images with high quality on a screen even if it is compact and energy efficient.

What is claimed is:

1. An image display device, comprising:
    a first color-ray light-source that supplies a first color-ray in a first wavelength region;
    a second color-ray light-source that supplies a second color-ray in a second wavelength region different from the first wavelength region;
    a tilt-mirror device having a plurality of movable mirror elements having positions thereof alternatively switchable between a first reflection position and a second reflection position,
    the first color-ray light-source being arranged so that the first color-ray is reflected in a predetermined direction when the movable mirror elements are located in the first reflection position, and the first color-ray is reflected in a direction different from the predetermined direction when the movable mirror elements are located in the second reflection position,
    the second color-ray light-source being arranged so that the second color-ray is reflected in the predetermined direction when the movable mirror elements are located in the second reflection position, and the second color-ray is reflected in a direction different from the predetermined direction when the movable mirror elements are located in the first reflection position, and
    the movable mirror elements being rotatable around a predetermined shaft; and
    a tilt-mirror device driving unit that drives that movable mirror elements corresponding to an image signal, so as to be switched at the first reflection position and the second reflection position, which is substantially symmetrical with the first reflection position around the predetermined shaft.

2. The image display device according to claim 1, the tilt-mirror device driving unit driving the movable mirror elements at the first reflection position that guides the first color-ray in the predetermined direction when the first color-ray light-source is turned on, while driving the movable mirror elements at the second reflection position that guides the second color-ray in the predetermined direction when the second color-ray light-source is turned on.

3. A projector, comprising:
an image display device according to claim 1; and
a projection lens that projects modulated light from the spatial light modulation device.

4. An image display device, comprising:
a first color-ray light-source that supplies a first color-ray in a first wavelength region;
a second color-ray light-source that supplies a second color-ray in a second wavelength region different from the first wavelength region;
a tilt-mirror device having a plurality of movable mirror elements having positions thereof alternatively switchable between a first reflection position and a second reflection position,
the first color-ray light-source being arranged so that the first color-ray is reflected in a predetermined direction when the movable mirror elements are located in the first reflection position, and the first color-ray is reflected in a direction different from the predetermined direction when the movable mirror elements are located in the second reflection position,
the second color-ray light-source being arranged so that the second color-ray is reflected in the predetermined direction when the movable mirror elements are located in the second reflection position, and the second color-ray is reflected in a direction different from the predetermined direction when the movable mirror elements are located in the first reflection position, and
a light-source driving unit that turns on the first color-ray light-source and the second color-ray light-source by sequentially switching the first color-ray light-source and the second color-ray light-source in turn, the light-source driving unit differentiating a turning-on period of the first color-ray light-source from a turning-on period of the second color-ray light-source.

5. The image display device according to claim 4, the light-source driving unit makes a turning-on period of the first color-ray light-source longer than a turning-on period of the second color-ray light-source.

6. The image display device according to claim 4, the light-source driving unit differentiating a unit period of a first color-ray gradation-expressing period from a unit period of a second color-ray gradation-expressing period.

7. The image display device according to claim 4, the light-source driving unit differentiating a frequency of a first color-ray light-source driving clock signal when driving the first color-ray light-source from a frequency of a second color-ray light-source driving clock signal when driving the second color-ray light-source.

8. The image display device according to claim 4, the first color-ray light-source driving clock signal and the second color-ray light-source driving clock signal further having a unit clock signal with a frequency common to both the signals.

9. A projection, comprising:
an image display device according to claim 1; and
a projection lens that projects modulated light from the spatial light modulation device.

10. An image display device, comprising:
a first color-ray light-source that supplies a first color-ray in a first wavelength region;
a second color-ray light-source that supplies a second color-ray in a second wavelength region different from the first wavelength region; and
a tilt-mirror device having a plurality of movable mirror elements having positions thereof alternatively switchable between a first reflection position and a second reflection position,
the first color-ray light-source being arranged so that the first color-ray is reflected in a predetermined direction when the movable mirror elements are located in the first reflection position, and the first color-ray is reflected in a direction different from the predetermined direction when the movable mirror elements are located in the second reflection position,
the second color-ray light-source being arranged so that the second color-ray is reflected in the predetermined direction when the movable mirror elements are located in the second reflection position, and the second color-ray is reflected in a direction different from the predetermined direction when the movable mirror elements are located in the first reflection position, and
the second color-ray light-source having a plurality of red color-ray light- emitting elements and a plurality of blue color-ray light-emitting elements, and the red color- ray light-emitting elements and the blue color-ray light-emitting elements being arranged on a common substrate.

11. A projector, comprising:
an image display device according to claim 10; and
a projection lens that projects modulated light from the spatial light modulation device.

12. An image display device, comprising:
a first color-ray light-source that supplies a first color-ray in a first wavelength region;
a second color-ray light-source that supplies a second color-ray in a second wavelength region different from the first wavelength region; and
a tilt-mirror device having a plurality of movable mirror elements having positions thereof alternatively switchable between a first reflection position and a second reflection position,
the first color-ray light-source being arranged so that the first color-ray is reflected in a predetermined direction when the movable mirror elements are located in the first reflection position, and the first color-ray is reflected in a direction different from the predetermined direction when the movable mirror elements are located in the second reflection position,
the second color-ray light-source being arranged so that the second color-ray is reflected in the predetermined direction when the movable mirror elements are located in the second reflection position, and the second color-ray is reflected in a direction different from the predetermined direction when the movable mirror elements are located in the first reflection position, and
the first color-ray light-source and the second color-ray light-source having a plurality of light-emitting elements, respectively, and each of the light-emitting elements including a light-emitting chip and a lens member that guides light from the light-emitting chip to the substantially entire region of the tilt-mirror device.

13. The image display device according to claim 12, the light-emitting elements further comprising a tapered rod member that guides light from the light-emitting chip in a predetermined direction.

14. The image display device according to claim 11, the light-emitting chip and the lens member being formed integrally with each other.

15. A projector, comprising:
an image display device according to claim 12; and
a projection lens that projects modulated light from the spatial light modulation device.

16. An image display device, comprising:
a first color-ray light-source that supplies a first color-ray in a first wavelength region;
a second color-ray light-source that supplies a second color-ray in a second wavelength region being at least different from the first wavelength region;
a spatial light modulation device that modulates light from the first color-ray light-source and the second color-ray light-source corresponding to an image signal; and
a light-source drive unit connected to the first color-ray light-source and the second color-ray light-source, the light source-drive unit differentiates a turning-on period of the first color-ray light-source from a turning-on period of the second color-ray light-source.

17. The image display device according to claim 16, the light-source drive unit making a turning-on period of the first color-ray light-source longer than a turning-on period of the second color-ray light-source.

18. A projector, comprising:
an image display device according to claim 17; and
a projection lens that projects modulated light from the spatial light modulation device.

19. The image display device according to claim 16, the light-source drive unit making a gradation-expressing period of the first color-ray light-source longer than a gradation-expressing period of the second color-ray light-source.

20. The image display device according to claim 19, the light-source drive unit differentiating a frequency of a first color-ray light-source driving clock signal when driving the first color-ray light-source from a frequency of a second color-ray light-source driving clock signal when driving the second color-ray light source.

21. A projector, comprising:
an image display device according to claim 19; and
a projection lens that projects modulated light from the spatial light modulation device.

22. The image display device according to claim 20, the first color-ray light-source driving clock signal and the second color-ray light-source driving clock signal further having a unit clock signal with a frequency common to both the signals.

23. A projector, comprising:
an image display device according to claim 20; and
a projection lens that projects modulated light from the spatial light modulation device.

24. A projector, comprising:
an image display device according to claim 22; and
a projection lens that projects modulated light from the spatial light modulation device.

25. The image display device according to claim 16, the first color-ray being green and the second color-ray being at least one of red and blue.

26. A projector, comprising:
an image display device according to claim 25; and
a projection lens that projects modulated light from the spatial light modulation device.

27. The image display device according to claim 25, the light-source drive unit differentiating a unit period of a first color-ray gradation-expressing period from a unit period of a second color-ray gradation-expressing period.

28. A projector, comprising:
an image display device according to claim 27; and
a projection lens that projects modulated light from the spatial light modulation device.

29. The image display device according to claim 16, the spatial light modulation device being a tilt-mirror device having a plurality of movable mirror elements that can alternatively select a first reflection position and a second reflection position, and
the tilt-mirror device being arranged so that the first color-ray and the second color-ray are reflected in a predetermined direction when the movable mirror elements are located in the first reflection position, while the first color-ray and the second color-ray are reflected in a direction different from the predetermined direction when the movable mirror elements are located in the second reflection position.

30. A projector, comprising:
an image display device according to claim 29; and
a projection lens that projects modulated light from the spatial light modulation device.

31. The image display device according to claim 16, the spatial light modulation device being one of a reflective liquid crystal light valve and a transmissive liquid crystal light valve.

32. A projector, comprising:
an image display device according to claim 31; and
a projection lens that projects modulated light from the spatial light modulation device.

33. A projector, comprising:
an image display device according to claim 16; and
a projection lens that projects modulated light from the spatial light modulation device.

34. A projector, comprising:
a first color-ray light-source that supplies a first color-ray in a first wavelength region;
a second color-ray light-source that supplies a second color-ray in a second wavelength region different from the first wavelength region; and
a tilt-mirror device having a plurality of movable mirror elements having positions thereof alternatively switchable between a first reflection position and a second reflection position,
the first color-ray light-source being arranged so that the first color-ray is reflected in a predetermined direction when the movable mirror elements are located in the first reflection position, and the first color-ray is reflected in a direction different from the predetermined direction when the movable mirror elements are located in the second reflection position, and
the second color-ray light-source being arranged so that the second color-ray is reflected in the predetermined direction when the movable mirror elements are located in the second reflection position, and the second color-ray is reflected in a direction different from the predetermined direction when the movable mirror elements are located in the first reflection position; and
a projection lens that projects modulated light from the titl-mirror device.

* * * * *